US011746898B2

(12) United States Patent
Schmidt et al.

(10) Patent No.: US 11,746,898 B2
(45) Date of Patent: Sep. 5, 2023

(54) ACTUATOR ARRANGEMENT FOR ELECTRIC DRIVE

(71) Applicant: GKN Automotive Limited, Birmingham (GB)

(72) Inventors: Mark Schmidt, Königswinter (DE); Simon Broicher, Hürth (DE)

(73) Assignee: GKN Automotive Limited, Birmingham (GB)

( * ) Notice: Subject to any disclaimer, the term of this patent is extended or adjusted under 35 U.S.C. 154(b) by 198 days.

(21) Appl. No.: 17/254,892

(22) PCT Filed: Jun. 28, 2018

(86) PCT No.: PCT/EP2018/067502
§ 371 (c)(1),
(2) Date: Dec. 22, 2020

(87) PCT Pub. No.: WO2020/001778
PCT Pub. Date: Jan. 2, 2020

(65) Prior Publication Data
US 2021/0207710 A1    Jul. 8, 2021

(51) Int. Cl.
| *F16H 63/18* | (2006.01) |
| *B60T 1/00* | (2006.01) |
| *F16H 61/22* | (2006.01) |
| *F16H 63/30* | (2006.01) |
| *F16H 63/34* | (2006.01) |

(52) U.S. Cl.
CPC .............. *F16H 63/18* (2013.01); *B60T 1/005* (2013.01); *F16H 61/22* (2013.01); *F16H 63/304* (2013.01);
(Continued)

(58) Field of Classification Search
CPC ........ F16H 63/08; F16H 63/18; F16H 63/304; F16H 63/3043; F16H 2063/3046;
(Continued)

(56) References Cited

U.S. PATENT DOCUMENTS

| 2007/0272511 A1 | 11/2007 | Saitoh |
| 2009/0193931 A1 | 8/2009 | Burgardt et al. |

(Continued)

FOREIGN PATENT DOCUMENTS

| CN | 205956370 U | 2/2017 |
| DE | 102005022926 B3 | 2/2007 |

(Continued)

*Primary Examiner* — Richard M Lorence
(74) *Attorney, Agent, or Firm* — Bejin Bieneman PLC

(57) ABSTRACT

An actuator arrangement for operating a clutch and a parking lock in a driveline of a motor vehicle comprises: a clutch having a clutch actuating member configured to drivingly connect or disconnect a clutch input part and a clutch output part; a parking lock having a locking element movable to a locking position to lock a ratchet wheel, and to a release position to release the ratchet wheel; and a parking lock actuating member for actuating the locking element; a controllable actuator with a movable actuator setting member which is movable into at least three setting positions and is operatively connected to the clutch actuating member and to the parking lock actuating member such that in a first setting position the parking lock is closed, in a second setting position the clutch is closed, and in a third setting position the clutch and the parking lock are opened.

20 Claims, 11 Drawing Sheets

(52) U.S. Cl.
CPC ..... *F16H 63/3408* (2013.01); *F16H 63/3425* (2013.01); *F16H 63/3043* (2013.01); *F16H 2063/3056* (2013.01); *F16H 2063/3063* (2013.01)

(58) Field of Classification Search
CPC ............ F16H 63/3408; F16H 63/3416; F16H 63/3425; F16H 63/3466; F16H 2063/3056; F16H 2063/3063; F16H 61/22; B60T 1/005; B60T 1/062
See application file for complete search history.

(56) References Cited

U.S. PATENT DOCUMENTS

| | | | |
|---|---|---|---|
| 2012/0115665 A1 | 5/2012 | Schwekutsch et al. | |
| 2014/0138206 A1* | 5/2014 | Kapp | F16H 63/48 192/219.5 |
| 2020/0158234 A1* | 5/2020 | Kwon | F16H 63/3466 |
| 2020/0158238 A1* | 5/2020 | Kwon | F16H 63/304 |
| 2020/0166130 A1* | 5/2020 | Kwon | F16H 63/3466 |

FOREIGN PATENT DOCUMENTS

| | | |
|---|---|---|
| DE | 102008063904 A1 | 7/2010 |
| DE | 10 2012 022 635 A1 | 5/2014 |
| DE | 10 2013 107 860 A1 | 1/2015 |
| DE | 102015008709 A1 | 1/2016 |
| EP | 2733394 A2 | 5/2014 |
| EP | 2916045 A1 | 9/2015 |
| WO | 2010078937 A1 | 7/2010 |
| WO | 2014038945 A1 | 3/2014 |
| WO | 2018001476 A1 | 1/2018 |

\* cited by examiner

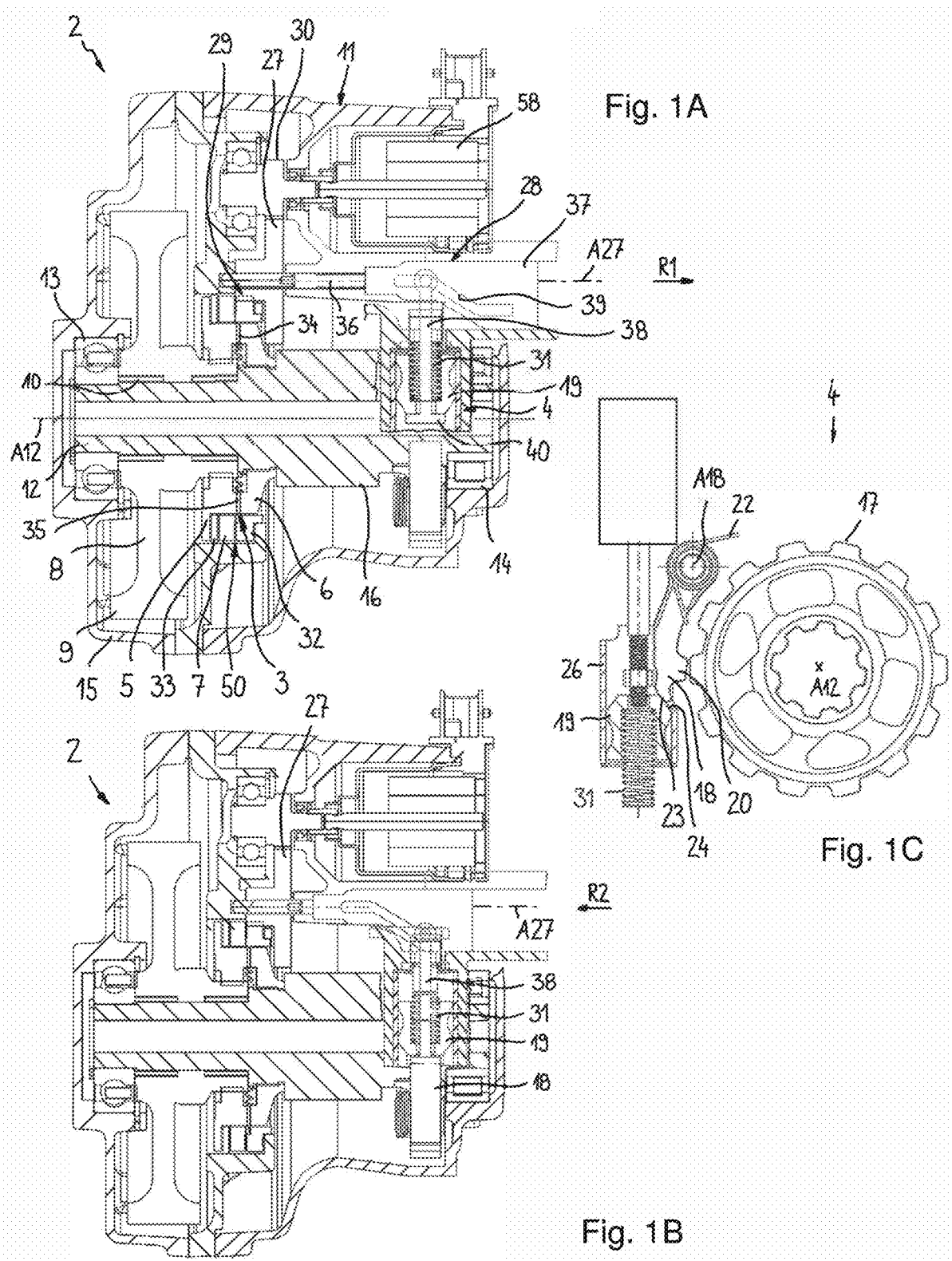

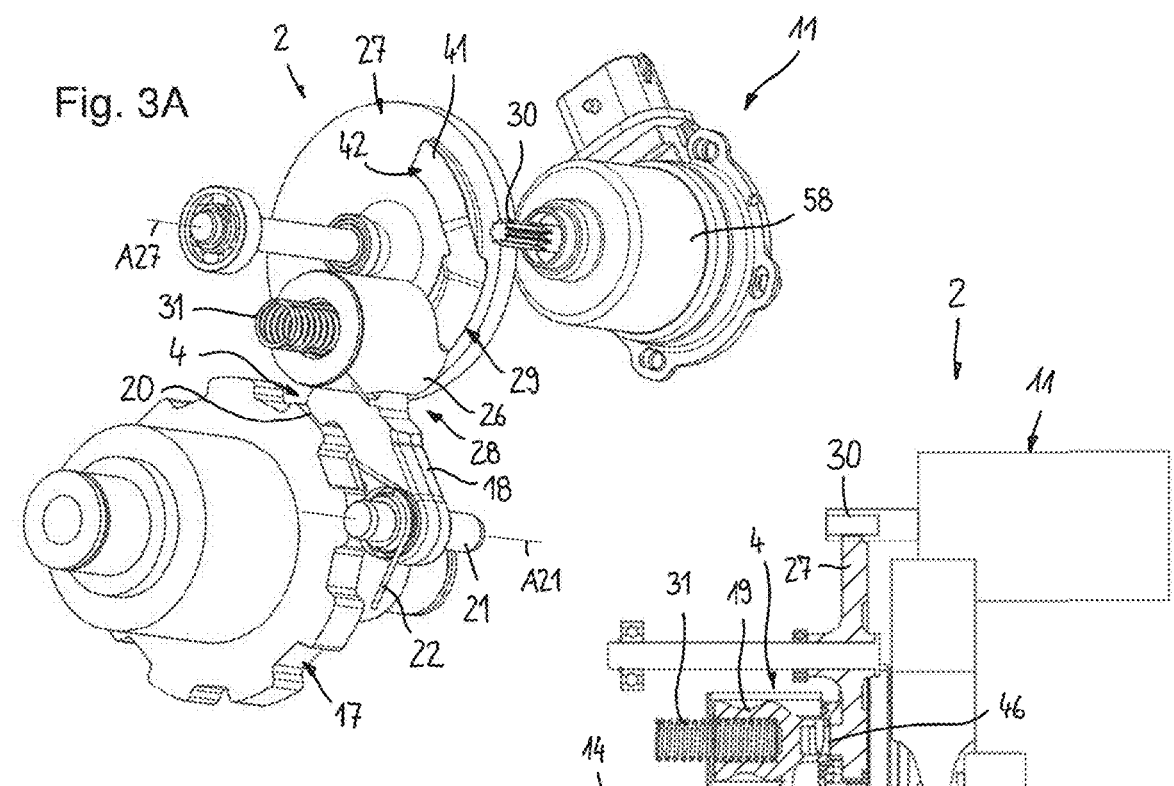
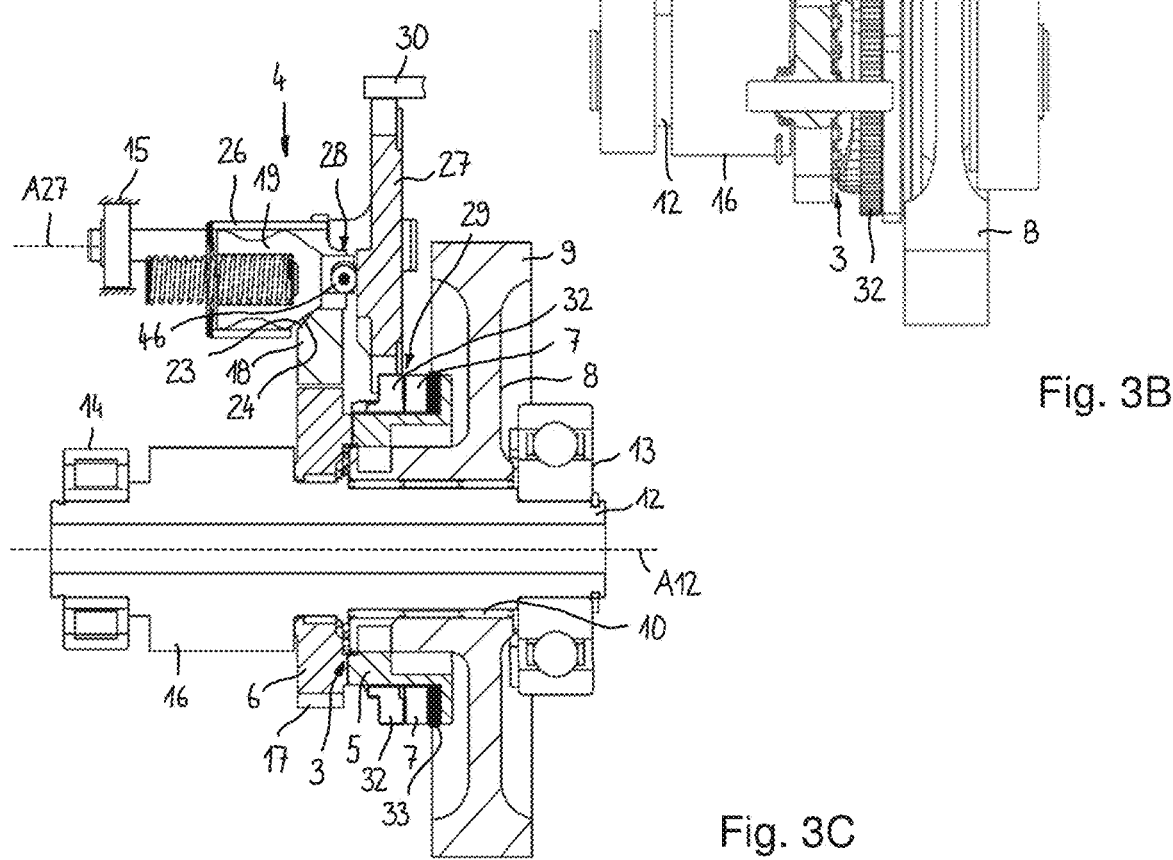

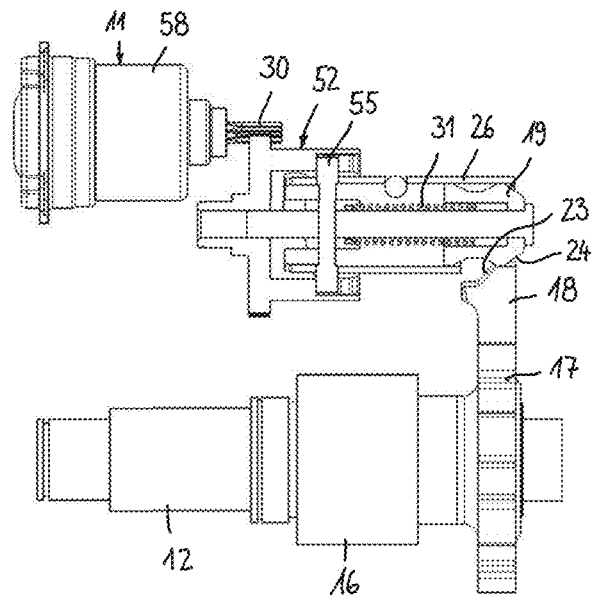
Fig. 9A
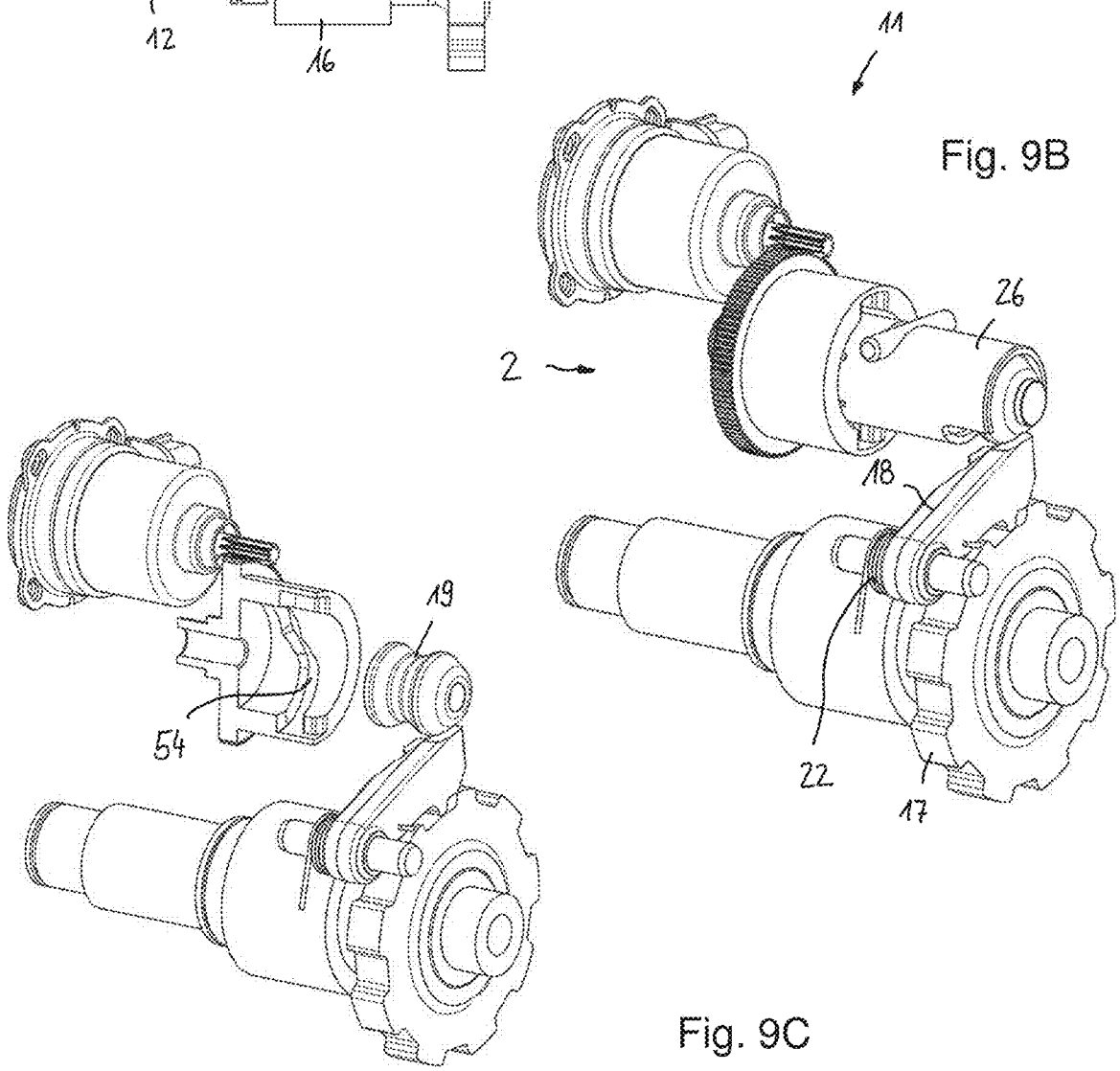
Fig. 9B
Fig. 9C

ACTUATOR ARRANGEMENT FOR ELECTRIC DRIVE

CROSS-REFERENCE TO RELATED APPLICATIONS

This application is a national stage of, and claims priority to, Patent Cooperation Treaty Application No. PCT/EP2018/067502, filed on Jun. 28, 2018, which application is hereby incorporated herein by reference in its entirety.

BACKGROUND

In general, actuators are used for a large number of functional units in automotive drivelines.

Actuators for parking locks are known to be used in vehicle drivelines to optionally lock a drive component in the driveline, thus preventing the vehicle from rolling away unintentionally when the drive source does not provide torque. A parking lock may comprise a ratchet wheel connected to a drive component in the driveline, a locking element cooperating with the ratchet wheel, and an actuator for operating the locking element. The locking element can be moved, by operating the actuator respectively, to a closed position in which the locking element blocks the ratchet wheel, and to a release position in which the locking element releases the ratchet wheel.

Actuators for clutches are known to be used in drivelines of motor vehicles to selectively establish, interrupt or adjust a torque transmission to a desired value.

Known are multi-axle driven vehicles with a first driveline for permanently driving a first drive axle and a second driveline for optionally driving a second drive axle. A distinction is made between different drive concepts, such as vehicles with a front engine, in which the front axle is permanently driven and the rear axle is selectively drivable. There are also vehicles with a front engine in which the rear axle is permanently driven and the front axle is selectively drivable. Finally, there are motor vehicles with a rear engine where the rear axle is permanently driven and the front axle is selectively drivable as required.

From DE 10 2005 022 926 B3 a drive unit for a motor vehicle is known, with an electric motor, a gearbox with at least two gear steps and a differential. The motor drives the differential via an intermediate shaft. An actuator arrangement is provided to operate the two gear steps, which has a rotatably drivable shift drum. By means of the shift drum a shift sleeve is actuated, which actuates a first shift clutch or alternatively a second shift clutch. A parking lock device is also provided, which is arranged coaxially to the motor shaft. The parking lock device comprises a locking sleeve which is mounted axially displaceably between a release position and a locking position. The locking sleeve can be operated by the same actuator arrangement as the clutches.

From DE 10 2008 063 904 A1, corresponding to WO2010/078937 A1, a drive arrangement for a multi-axle driven motor vehicle is known. The drive arrangement comprises a differential unit, a controllable hang-on clutch for drivingly connecting with a drive unit and a locking clutch for locking the compensating movement of the differential. The two clutches are arranged coaxially to each other and can be actuated by a ball ramp assembly. According to an embodiment it is provided that first the locking clutch and then the hang-on clutch is actuated. According to another embodiment it is provided that first the hang-on clutch is actuated and then the locking clutch.

SUMMARY

The present disclosure refers to an actuator arrangement for a driveline of a motor vehicle. The present disclosure further refers to an electric drive for driving a motor vehicle with such an actuator arrangement.

A multi-functional actuator arrangement having a simple and space-saving design is disclosed, along with a driveline arrangement with such an actuator arrangement.

An actuator arrangement for operating a clutch and a parking lock in a driveline of a motor vehicle comprises: a clutch having a rotatably drivable clutch input member, a clutch output member, and a clutch actuating member configured to drivingly connect or disconnect the clutch input member and the clutch output member; a parking lock comprising a ratchet wheel rotationally fixedly connected to a drive shaft that is drivingly connected to one of the clutch input member and the clutch output member, a locking element cooperating with the ratchet wheel and movable to a locking position in which the locking element locks the ratchet wheel and a release position in which the locking element releases the ratchet wheel, and a parking lock actuating member for actuating the locking element; a controllable actuator with a movable actuator setting member which can be transferred into at least three setting positions and is operatively connected to the clutch actuating member and to the parking lock actuating member such that in a first setting position (S1) the parking lock is closed, in a second setting position (S2) the parking lock is open and the clutch is already closed, and in a third setting position (S0) the clutch and the parking lock are open.

An advantage is that only one actuator is required to operate the parking lock and the clutch. Thus, the proposed actuator arrangement requires only a small number of components, which has a positive effect on the required installation space and the manufacturing and assembly costs. In addition to the mechanical integration of parking lock and clutch actuation, an electrical integration is also achieved accordingly, which also has a favorable effect on the reliability and service life of the arrangement due to a lower number of electrical interfaces.

According to a first embodiment respectively a first functional principle of the actuator arrangement, it is provided that the clutch is open in the first actuating position (S1) of the actuator setting member. This means that between the first actuating position (S1), in which the driveline is locked by the parking lock, and the second actuating position (S2), in which the driveline can transmit torque, a distinct neutral position is provided, in which both the parking lock and the clutch are open. This means that before the clutch can be safely closed, the parking lock must be safely open. Generally, the duration of the neutral position can be arbitrarily small, i.e., greater than or equal to zero.

According to a second embodiment respectively a second functional principle of the actuator arrangement, it is provided that the clutch is closed in the first actuating position (S1) of the actuator setting member. This means that no neutral position is passed between the first actuating position (S1), in which the driveline is locked by the parking lock, and the second actuating position (S2), in which the driveline can transmit torque. This means that the clutch can already be operated while the parking lock is not yet fully open. This embodiment has the advantage of a particularly fast shifting speed and thus fast availability of the torque in the driveline. The vehicle can be started and/or accelerated directly from the parking position.

According to an embodiment, the clutch output part can be connected to the same drive shaft to which the ratchet wheel is connected to in a rotationally fixed manner. Generally, however, it is also possible that the ratchet wheel is connected to another shaft in the driveline.

The actuator setting member can be connected to the parking lock actuating member via a first force transmission mechanism and can be connected to the clutch actuating member via a second force transmission mechanism. Accordingly, a drive movement introduced from the actuator into the setting member is divided into two power paths, namely a first power path to actuate the parking lock and a second power path to actuate the clutch. In particular, it is provided that the parking lock actuating element is movable by the first force transmission mechanism over a first travel path to actuate the parking lock, and the clutch actuating element is movable by the second force transmission mechanism over a second travel path to actuate the clutch. The first and second travel paths shall preferably be coordinated, and/or the actuators shall be configured such that when one of the clutch and parking lock units is actuated, the other unit maintains a defined position.

Generally, the actuator for operating the clutch and/or parking lock can be of any design. Electromotive, electromagnetic, hydraulic or pneumatic actuators can be used, which can be controlled by an electronic control unit according to the requirements. According to an embodiment, the actuator can have a rotary drive, for example an electric motor, which can rotatably drive the actuator setting member in a first direction of rotation and in an opposite second direction of rotation. The force transmission mechanisms can be designed such that—in each case starting from a neutral position—when the rotary drive rotates in the first direction of rotation, the parking lock actuating element is actuated, for example closed, and when the rotary drive rotates in the opposite direction of rotation, the clutch actuating element is actuated, for example closed.

The actuator setting member may have teeth that mesh with a rotatably drivable ring to actuate the clutch. In particular, the actuator setting member may be designed in the form of an intermediate gear located in the power path between the rotary drive and the clutch actuation.

According to a possible embodiment, the first force transmission mechanism for the parking lock may include a spindle drive with a rotatably drivable spindle shaft and a spindle sleeve connected thereto, as well as a coupling rod. The spindle shaft can be rotatably driven by the actuator setting member. The spindle sleeve may have a slot with a inclination component in which the coupling rod is guided with a first end, wherein a second end of the coupling rod may be connected to the parking lock actuating member so that a rotational movement of the spindle sleeve at least indirectly causes a shifting movement of the parking lock actuating member. The displacement of the parking lock actuating element in the opening direction of the parking lock can take place actively by means of the coupling rod, in particular against the pretensioning force of a spring. When moving the coupling rod in the opposite direction, i.e. in the closing direction of the parking lock, the parking lock actuating member is released and can be actively moved by the spring.

According to another embodiment, the first force transmission mechanism may comprise a contour element with a setting contour designed to convert a rotational movement of the actuator setting member into a translational movement of the parking lock actuating element. It is provided in particular that the parking lock actuating element is at least indirectly supported on the setting contour and is axially movable by rotating the setting contour. The setting contour may be formed in one end face of the contour element; in this case the parking lock actuating element is aligned at least approximately parallel to the axis of rotation of the contour element. Alternatively, the setting contour can also be formed in a peripheral surface of the contour element; in this case, the parking lock actuating member is oriented at least approximately radially to the axis of rotation of the contour element.

The contour element of the first force transmission mechanism can be firmly connected to the actuator setting member according to an embodiment, in particular it may be designed in one piece with it. Alternatively, the contour element can also be drivingly connected to the actuator setting member via an intermediate shaft. This includes as a first possibility that the contour element is connected to the intermediate shaft in a rotationally fixed manner and rotates jointly with the actuator setting member. As a second possibility, the contour element can also be designed as a toothed rack which is in engagement with the intermediate shaft and which is moved translationally accordingly when the actuator setting member is rotated. In this case, rotation in the first direction of rotation causes a sliding movement in a first slide direction and correspondingly, rotation in the opposite direction of rotation causes a sliding movement in the opposite slide direction. The toothed rack has on its back side a setting contour with a variable height over the length. By shifting the toothed rack, the parking lock actuating element supported on the setting contour is moved towards or away from the pawl. A roller can be provided between the setting contour of the contour element and the actuating member, via which the axial force is transmitted from the contour element to the actuating member.

According to a further embodiment, the first force transmission mechanism can have an angular drive with a rotatably drivable actuating shaft and a parking lock shaft drivingly connected therewith on which the parking lock actuating member is arranged such that the parking lock actuating member is axially movable by rotation of the parking lock shaft. The actuating shaft is connected in a rotationally fixed manner to the actuator setting member and is driven thereby respectively. A nut may be provided on the actuating shaft which is moved axially upon rotation of the shaft and against which the parking lock actuating member is supported.

According to another embodiment, the first force transmission mechanism may comprise a spindle drive with a rotatably drivable spindle shaft and a spindle nut connected thereto, against which the parking lock actuating member is at least indirectly supported. The spindle shaft is driven by the actuator setting member, which can also be done indirectly with further drive elements being interposed. For example, the rotary motion from the actuator setting member to the spindle shaft can be transmitted via a ring in meshing engagement therewith and, optionally, an intermediate gear meshing with the ring. A rotary movement of the actuator setting member in a first direction of rotation causes a corresponding rotation of the spindle shaft and a shifting movement of the parking lock actuating member in a first actuating direction. If the actuator setting member is rotated in the opposite, second direction of rotation, the parking lock actuating element is moved in a second direction of actuation. The parking lock actuating member can be axially supported against a spindle nut located on the spindle shaft.

According to another embodiment, the first force transmission mechanism may comprise a setting sleeve, which is at least indirectly rotatably drivable by the actuator setting member, and a coupling element connected to the parking lock actuating member. The setting sleeve may also be referred to as the shifting drum. In particular, it is provided that one of the two parts, the setting sleeve and the coupling element, has a setting contour which interacts with a counter contour of the other one of the two parts such that a rotary movement of the setting sleeve effects a shifting movement of the parking lock actuating member.

According to a further embodiment, the first force transmission mechanism may have a coupling rod against which the parking lock actuating member is at least indirectly supported, wherein the coupling rod is loaded by a spring in direction towards the setting contour and is supported against same. The setting contour is preferably configured such that by rotating the actuator setting member the coupling rod is moved radially with respect to the axis of rotation of the actuator setting member.

The second force transmission mechanism associated with the clutch preferably comprises a ramp assembly configured to convert rotary motion of the actuator setting member into translatory motion of the clutch actuating member. The ramp assembly may include a support ring which is axially supported relative to a stationary component and a setting ring which is axially displaceable relative to the support ring. In this case, the setting ring may form the clutch actuating member and/or can be formed in one piece therewith (all figures). The axially supported support ring can be rotatably driven by the actuator setting member, wherein the axially movable setting ring is guided in a rotationally fixed manner in this case. The ramp assembly can also be designed in the form of a ball ramp assembly, wherein the support ring and the setting ring are supported against each other via balls which run in grooves of the rings having a variable depth over the circumference. An embodiment according to the sliding sleeve principle is also possible to convert a rotary movement into a sliding movement.

It applies for all of the above-mentioned embodiments that they may have an elastically pretensioned fixing element configured to fix the actuator setting member in at least one position.

A position sensor may be provided which is designed to detect a measured value representing the position of the actuator setting member. Sensor data acquired by the position sensor can be transmitted to an electronic control unit to control the actuator. This enables reliable, precise and fast control.

The clutch can generally be of any design and can include any clutch with which a torque transmission in the driveline of a motor vehicle can either be effected or interrupted. For example, a positive-locking clutch can be used. A positive-locking clutch comprises at least two clutch parts that interlock positively in the closed state to transmit a torque and are disengaged in the open state, for example a tooth clutch or a dog clutch. Alternatively, a friction clutch can be used, in particular a friction plate clutch.

The clutch can have two clutch parts, one of which being connected to the drive shaft in a rotationally fixed manner and a second clutch part being connected to a second drive part in a rotationally fixed manner. One of the two clutch parts is axially supported on a stationary component, while the other clutch part is axially movable. The clutch can be optionally transferred into a closed position, in which the two shafts are drivingly connected to each other for torque transmission, and into an open position, in which the two shafts are disconnected from each other.

According to an embodiment, a return spring is provided, which acts on the clutch in the closing direction. Generally, however, a reverse embodiment is also possible, in which the return spring is effective in the opening direction of the clutch. In this case, the actuating device would act in the corresponding reverse direction, too, i.e. against the spring force.

The object is further solved by an electric drive arrangement for driving a motor vehicle, comprising: an electric machine with a motor shaft; a reduction gearing, which is configured to transmit a torque introduced by the motor shaft to a slow speed; a power-split unit with an input part and two output parts, the power-split unit being configured to transmit a rotary motion introduced by the reduction gearing to the two output parts; wherein an actuator arrangement is provided which can have one or more of the above-mentioned specifications and which is arranged in particular in the power path of the reduction gearing.

The power split unit can be in the form of a differential gearing with a differential cage as input part and two output gears as output parts. Alternatively, the power split unit can also be designed as a double clutch with a clutch basket as input part and two separately controllable friction clutches with two clutch hubs as output parts. Such a double clutch, also referred to by the applicant as 'twinster', allows variable torque distribution to the two side shafts.

BRIEF SUMMARY OF THE DRAWINGS

Example embodiments are explained below using the drawing figures. Herein shows:

FIG. 1A shows an example actuator arrangement in a longitudinal section in an open position of the parking lock;

FIG. 1B shows the example actuator arrangement of FIG. 1A in a closed position of the parking lock;

FIG. 1C shows a detail of the example actuator arrangement of FIG. 1A including a parking lock in a cross section;

FIG. 3A shows a second example actuator arrangement in three-dimensional representation;

FIG. 3B shows the second example actuator arrangement of FIG. 3A in a longitudinal section;

FIG. 3C shows the second example actuator arrangement of FIG. 3A in a side view;

FIG. 9A shows a further example actuator arrangement in lateral view, partly cut;

FIG. 9B shows the example actuator arrangement of FIG. 9A n three-dimensional representation;

FIG. 9C shows the example actuator arrangement of FIG. 9A in three-dimensional representation, partially cut;

DESCRIPTION

Figure 2A:
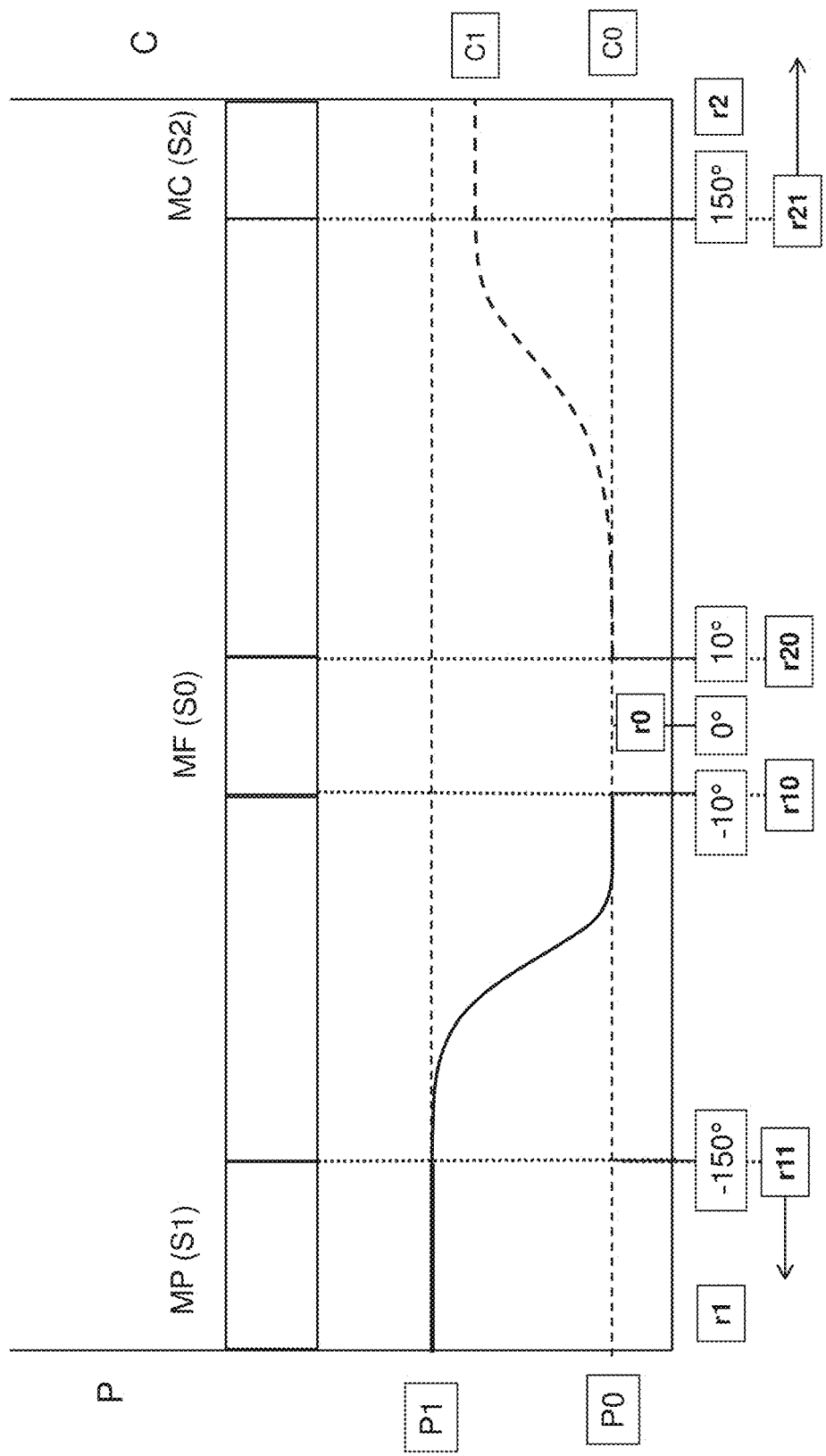
FIG. 2A shows a diagram for illustrating various switching conditions of an actuator arrangement according to a first functional principle.

FIGS. 1A to 1C, which are described together below, show an example actuator arrangement 2 for operating a clutch 3 and a parking lock 4 in a driveline of a motor vehicle in a first embodiment. The clutch 3 serves to control a torque transmission in the driveline of the motor vehicle as required. The parking lock 4 is used to optionally lock a drive component in the driveline of the motor vehicle so that the motor vehicle is prevented from rolling away unintentionally if the drive source does not provide torque. The actuator arrangement 2 with clutch 3 and parking lock 4 can be used in particular for a multi-axle driven motor vehicle that has a permanently driven primary drive axle and an optionally driven secondary drive axle without being restricted to this application.

In the present case, the clutch 3 comprises a rotationally drivable clutch input part 5, a clutch output part 6, and a clutch actuating member 7 configured to drivingly connect or disconnect the clutch input part 5 and the clutch output part 6. In the present embodiment, the clutch input part 5 is connected to a drive part 8 in a rotationally fixed and axially movable manner, which is rotatably mounted on a drive shaft 12 via bearing means 10. The drive part 8 is formed as a hollow shaft which is firmly connected to a drive gear 9. The drive shaft 12 is mounted in a stationary housing 15 via further bearing means 13, 14 so as to be rotatable about an axis of rotation A12. The shaft 12 has an output gear 16, which in the present case is integrally formed with the shaft and is configured to transmit torque to a drive unit (not shown), e.g., a differential gearing or a double clutch, arranged downstream in the power path.

The parking lock 4 comprises a ratchet wheel 17, which is connected to the drive shaft 12 in a rotationally fixed manner, a locking element 18, which interacts with the ratchet wheel 17 and is movably mounted in the stationary housing 15, and a parking lock actuating member 19 for actuating the locking element 18. The locking element 18 can be transferred to a locking position in which the locking element 18 locks the ratchet wheel 17 so that the drive shaft 12 is held rotationally fixed, and to a release position in which the locking element 18 releases the ratchet wheel 17 so that the ratchet wheel 17 and the drive shaft 12 connected thereto can rotate freely.

The parking lock 4, which can also be referred to as parking lock unit, is shown as a functional detail in FIG. 1C. It can be seen that the ratchet wheel 17 has a large number of engagement recesses distributed around its circumference on an outer circumferential surface, in which the locking element 18 can positively engage with a ratchet tooth 20. The locking element 18 can be transferred to a locking position in which it is positively connected to the ratchet wheel 17 so that the ratchet wheel is prevented from rotating. In the unlocked position, the locking element 18 is pivoted outwards with respect to the ratchet wheel 17 so that the ratchet wheel and thus the output shaft 12 of the drive assembly can rotate freely.

The locking element 18 is designed in the form of a locking pawl 18, with an end section of which being mounted in the housing 15 so as to be pivotable about a pivot axis A18. A spring element 22 is provided to move the locking pawl 18 from the locking position to the release position. The spring element 22 is designed in the form of a leg spring, with a first leg of the leg spring being supported on a stationary component and with a second leg being supported on the locking pawl 18.

At its opposite free end, the locking pawl 18 comprises a functional face 23 on the outside which interacts with a pressure face 24 of the actuating member 19 which is movable by the actuator 11. The functional face 23 is inclined with respect to a radial plane containing the axis of rotation A12 and running through the contact point between the functional face 23 and the pressure face 24. In this way, a translatory movement of the actuating member 19 is converted into a pivoting movement of the locking pawl 18. A guide sleeve 26 is provided for guiding the actuating member 19, in which the actuating member 19 is guided so as to be axially movable.

Both the clutch 3 and the parking lock 4 are operated by means of the controllable actuator 11. The actuator comprises a movable actuator setting element 27, which is operatively connected to the clutch actuating member 7 and to the parking lock actuating member 19. The operative connection is such that in a first setting position and/or setting direction the parking lock 4 is closed (parking mode) and in a second setting position and/or setting direction the clutch 3 is closed (drive mode). The actuator setting member 27 can assume a further setting position between the first and second setting position, in which the clutch 3 and the parking lock 4 are opened (free-running mode). The actuator setting member 27 is connected to the clutch actuating member 7 via a first force transmission mechanism 28 and to the parking lock actuating member 19 via a second force transmission mechanism 29.

In the present embodiment, the actuator 11 is designed in the form of an electromechanical actuator and comprises an electric motor 58, which is controllable by an electronic control unit (not shown) and converts electrical energy into a rotary motion. However, it is to be understood that the actuator can alternatively be designed in the form of an electromagnetic, hydraulic or pneumatic actuator, for example. The actuator setting member 27 is here designed in the form of an intermediate gear, which is mounted in the housing 15 so as to be rotatable about an axis of rotation A27. The intermediate gear 27 is rotatably driven by a drive pinion 30 of the electromechanical actuator 11 and transmits the rotary motion to the first and second force transmission mechanism 28, 29, respectively.

In the present case, the transmission mechanism 29 for the clutch 3 has a ramp assembly 50 which is configured to convert a rotational movement of the intermediate gear 27 into a translatory movement of the clutch actuating member 7. In this way, the first clutch member 5 and the second clutch member 6 can be engaged with each other to transmit torque, or disconnected from each other so that a torque transmission is interrupted. The ramp assembly 50 comprises a support ring 32, which is rotationally drivable by the intermediate gear 27 and is axially supported against the stationary housing 15, and a setting ring, which is axially displaceable relative to the support ring 32 and is axially supported on the first clutch part 5. In this case, the setting ring forms the clutch actuating member 7, which axially loads the clutch part 5 via an intermediate axial bearing 33.

The ramp arrangement 50 is designed such that—starting from an end position in which the two rings 32, 7 are axially approached—the setting ring 7 is moved axially away from the supporting ring 32 by relative rotation of the supporting ring 32. For this purpose, the two rings 32, 7 have respective setting contours with which they are axially supported against each other. The setting contours have a variable height when viewed in the circumferential direction, so that a relative rotational movement of the rotatably drivable support ring 32 is converted into an axial movement of the setting ring 7. The setting ring 7 is axially supported via the axial bearing 33 on a collar of the first clutch part 5, so that an axial movement of the setting ring causes an axial movement of the clutch part 5.

It can be seen that the clutch 3 is designed as a form-locking clutch, wherein the first clutch part 5 has first engagement means 34 which can be brought into form-locking engagement with counterpart engagement means 35 of the second clutch part 6. The first and second engagement means 34, 35 are designed in the manner of face teeth. In this respect, the clutch 3 can also be referred to as a tooth or claw clutch. However, it is to be understood that other types of clutches can also be used, which can either establish or interrupt a torque transmission.

The force transmission mechanism 28 for the parking lock 4 comprises a spindle drive with a rotationally drivable spindle shaft 36 and a spindle sleeve 37 connected thereto, as well as a coupling rod 38. The spindle sleeve 37 has a slot 39 with a gradient component in which the coupling rod 38 is guided with a first end. At the opposite second end 40 of the coupling rod 38, the parking lock actuating member 19 is supported, wherein a spring 31 is provided which acts on the parking lock actuating member 19 in the direction towards the end stop 40. Turning the spindle shaft 36 in a first direction of rotation causes the spindle sleeve 37 screwed thereon to move in the first axial direction R1 away from the intermediate gear 27. In the shift position distant from the intermediate gear, as shown in FIG. 1A, the spindle sleeve 37 is moved away from the intermediate gear 27 so that the coupling rod 38 guided in the guide slot 39 of the sleeve 37 is approached to the spindle shaft 36 with its sleeve-side end. Accordingly, the actuating member 19 is displaced away from the functional face 23 of the locking pawl 18 against the pretensioning force of the spring 31. The locking pawl 18 is released and pivoted radially outwards with respect to the ratchet wheel 17 by the spring force of the spring element 22.

By rotating the spindle shaft 36 in the opposite second direction of rotation, the spindle sleeve 37 is moved accordingly in the axially opposite second direction R2, i.e., towards the intermediate gear 27. The guide end 39 of the coupling rod 38 is moved along the guide slot 39 of the sleeve 37 away from the spindle shaft 36 and respectively towards the actuating member 19. The actuating member 19 is released accordingly and is loaded by the spring 31 against the functional face 23 of the locking pawl 18. If the tooth 20 is arranged in the area of a recess in the ratchet wheel 17, the actuating member 19 acts on the locking pawl 18 in the closing direction and forces it radially inwardly. The tooth 20 positively engages into one of the recesses of the ratchet wheel 18 so that the latter is secured against rotation. This closed position of the parking lock 4 is shown in FIG. 1B.

To release again, the spindle sleeve 37 is moved back to its first position. To prevent the spindle sleeve 37 from co-rotating when the spindle shaft 36 is rotated, the spindle sleeve 37 is suitably secured against rotation relative to the stationary component. The spring 31 is preferably designed in the form of a coil spring, which is arranged in an accommodation space of the actuator 19. The spring 31 is axially supported on one side against the actuating member 19 and on the other side against the parking lock housing.

Due to the design of the force transmission mechanism 29, a rotational movement of the spindle sleeve 37 causes a shifting movement of the parking lock actuating member 19.

The various adjustable operating modes MP, MF, MC and the interaction of the movement paths of the components substantially involved in the operation of clutch 3 and parking lock 4 are explained below according to a first operating principle using FIG. 2A.

In neutral rotation position r0 of the actuator setting member 27, both the clutch 3 and the parking lock 4 are open. This operating mode is therefore also called free-running mode MF or neutral mode. The vehicle is not driven by the electric motor, but only by the primary drive source. By rotating the actuator setting member 27 in the first direction of rotation r1, the spindle shaft 36 is correspondingly rotated in the same direction, wherein the spindle sleeve 37 is moved translationally and the coupling rod coupled thereto is moved from position P0 to position P1, which is shown by the solid line. The coupling rod 38 starts to move when the spindle shaft 36 has reached the rotation position r10. This position is shown here exemplary with 10° without being restricted thereto. When reaching the rotation position r11 in the first direction of rotation r1, the coupling rod 38 has reached the end position P1 in which the parking lock 4 is closed. This operating mode can also be referred to as parking mode MP or first mode. The parking lock is closed while the coupling is open. The parking lock is reopened by rotating the actuator setting member 27 back again from the rotational position r11 to the neutral position r0, i.e. in the opposite direction of rotation r2. In the range between the free-running mode MF and the parking mode, the vehicle is not in operation.

In the neutral position r0, the clutch 3 is also open, i.e. the two rings 7, 32 of the ramp mechanism are spaced apart. If, starting from this neutral position r0, the actuator setting member 27 is rotated in the second direction of rotation r2, the disk 7 and the clutch part 5 supported thereagainst moves from the clutch position C0 to the position C1, which is shown by the dotted line. The clutch part 5 starts to move when the actuating member 27 passes the rotation position r20. This is shown here exemplary with 10°, although other values are also possible. During the transition between the free-running mode MF and the clutch mode MC, the components rotating at different speeds are synchronized. When reaching the rotational position r21 in the second direction of rotation r2, the clutch part 5 has reached the end position C1, in which the clutch 3 is completely closed. This operating mode can also be described as clutch mode MC or second mode. The parking lock is open while the clutch is closed, so that the vehicle can be driven by the electric motor. The clutch is opened again by rotating the actuator setting member 27 back from the rotational position r21 to the neutral position r0.

This free-running mode MF, in which the clutch and parking lock are open, is selected, for example, if the vehicle exceeds a certain vehicle speed at which electric motor drive is no longer desired.

Figure 2B:
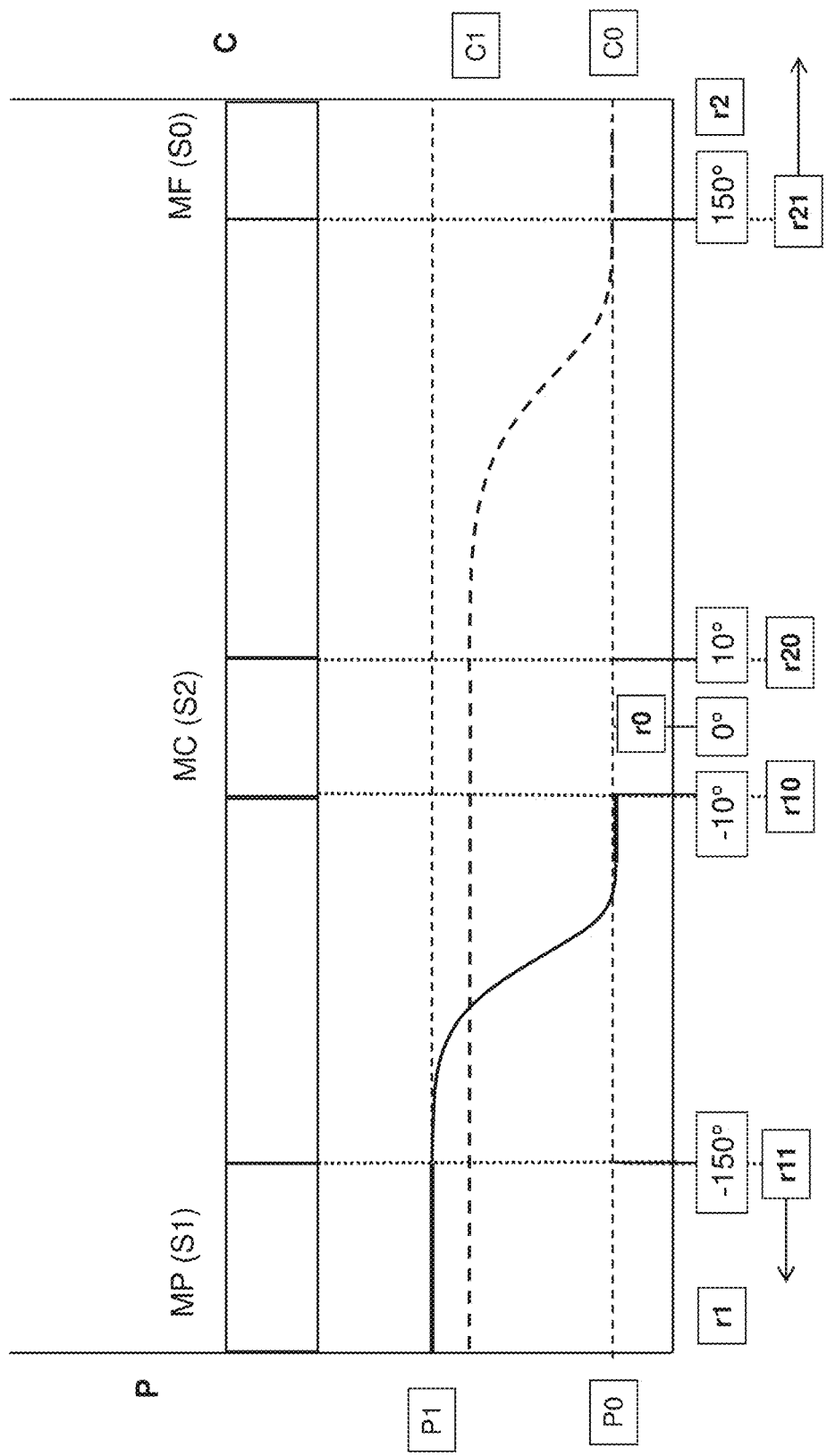
FIG. 2B shows a diagram for illustrating various switching conditions of an actuator arrangement according to a second functional principle.

FIG. 2B shows a second functional principle which can be realized if the actuator arrangement is designed accordingly. The present functional principle largely corresponds to the principle shown in FIG. 2A, so that with regard to the common features reference is made to the above description. The movement of the actuator for the parking lock is shown with a solid line, while the movement of the actuator for the clutch is shown with a dashed line. It is understood that all the embodiments described in the present disclosure can be designed either according to the first functional principle or according to the second functional principle, which can be realized by respective design of the actuator arrangement.

The motion kinematics for the parking lock according to FIG. 2B is identical to the embodiment according to FIG. 2A. The parking mode MP is active when the coupling rod 38 has reached the end position P1. The parking lock is closed. In contrast to the above embodiment, the present embodiment according to FIG. 2B provides that in parking mode MP the clutch is also closed. If the actuator setting member 27 is rotated from the rotary position r11 to position r0, the parking lock is opened (solid line between MP and MC), while the clutch remains closed (dashed line between MP to MF). In this range between the parking mode MP and the clutch mode MC, the vehicle is not driven by the electric motor. The clutch mode MC, in which the vehicle is driven by the electric motor, is reached when the parking lock is fully open, i.e. when the rotary position r10 is reached or exceeded respectively. The release mode MF is reached by rotating further beyond the rotary position r20. The clutch is opened by rotating the actuator setting member 27 in the direction r2 between the clutch mode MC and the release mode MF. When the rotary position r21 is reached, in this example at approximately 150°, the clutch is fully opened. The electric motor is completely disconnected from the driveline. By rotating back in the direction r1, the clutch is closed again. Between the release mode MF and the clutch mode MC, a synchronization phase is run through in which the speeds of the components rotating relative to each other are synchronized.

FIGS. 3A, 3B and 3C, which are described together below, show a clutch arrangement 2 in a second embodiment. This largely corresponds to the embodiment as shown in FIGS. 1 and 2, the description of which is referred to in this respect. The same or corresponding details are marked with the same reference signs as in FIG. 1.

The clutch 3 has a rotationally drivable clutch input part 5, a clutch output part 6, and a clutch actuating member 7 designed to drivingly connect or disconnect the clutch input part 5 and the clutch output part 6. In the present embodiment, the clutch input part 5 is connected to the drive part 8 in a rotationally fixed and axially movable manner. The drive part 8 comprises a hollow shaft portion, which is rotatably mounted on a drive shaft 12 by bearing means 10, as well as a drive gear 9 connected thereto, via which a torque can be introduced from a drive source. The drive shaft 12 is mounted in a stationary housing 15 via further bearing means 13, 14 so as to be rotatable about an axis of rotation A12. The shaft 12 has an output gear 16, which in the present embodiment is integrally formed with the shaft and serves to transmit torque to a downstream drive unit.

The parking lock 4 comprises a ratchet wheel 17 which is firmly connected to the second clutch part 6, in particular is designed in one piece therewith, a locking element 18 which interacts with the ratchet wheel 17 and is movably mounted in the stationary housing 15, and a parking lock actuating member 19 for actuating the locking element 18. The locking element 18 can be transferred into a locking position, in which the locking element 18 locks the ratchet wheel 17 so that the second clutch part 6 is held rotationally fixed, and into a release position, in which the locking element 18 releases the ratchet wheel 17 so that the ratchet wheel 17 and the second clutch part 6 connected thereto can rotate freely.

The locking element 18 is designed as a locking pawl, which is pivotably mounted by a bearing pin 21 in the housing 15, which is not shown in detail, so as to be pivotable about the pivot axis A18. A spring element (not shown) is provided to move the locking pawl 18 from the locked position to the release position.

At its free end, the locking pawl 18 has on an outside a functional face 23, which interacts with a pressure face 24 of the actuating member 19. It can be seen in particular in FIG. 3A that the direction of movement of the actuating member 19, which is pushed by the spring 31 towards the locking pawl 18, is parallel to the pivot axis A18 of the locking pawl 18. The functional face 23 of the locking pawl 18 is arranged at an angle to a radial plane perpendicular to the axis of rotation A12, which plane passes through the point of contact between the functional face 23 and the pressure face 24. In this way, a translatory movement of the actuating member 19 is converted into a pivoting movement of the locking pawl 18. To guide and support the actuating member 19, the guide sleeve 26 is provided in which the actuating member 19 is guided so as to be axially movable.

The clutch 3 and the parking lock 4 are operated by the controllable actuator 11. The actuator 11 comprises an actuator setting member 27 which is rotatably drivable by the motor shaft of the electric motor 58 and is operatively connected to the clutch actuating member 7 and to the parking lock actuating member 19. The operative connection is such that in a first setting position and/or setting direction the parking lock 4 is closed (parking mode) and in a second setting position and/or setting direction the clutch 3 is closed (drive mode). The actuator setting member 27 can assume a further setting position between the first and second setting position, in which the clutch 3 and the parking lock 4 are opened (free-running mode). The actuator setting member 27 is connected to the parking lock actuating member 19 via a first force transmission mechanism 28 and to the clutch actuating element 7 via a second force transmission mechanism 29.

In the present embodiment, the actuator setting member 27 is designed in the form of a combined ramp gearwheel, which is supported in the housing 15 so as to be rotatable about an axis of rotation A27. The ramp gearwheel 27 is rotatably driven by the drive pinion 30 of the electric motor 58 and transmits the rotary motion to the first and second force transmission mechanism 28, 29 respectively.

In the present embodiment, the force transmission mechanism 29 for the clutch 3 has a ramp arrangement 50 configured to convert a rotary motion of the ramp gearwheel 27 into translatory motion of the clutch actuating member 7. In this way, the first clutch member 5 and the second clutch member 6 can be engaged with each other to transmit torque, or decoupled from each other so that a torque transmission is interrupted. The ramp arrangement 50 comprises a support ring 32, which is rotatably drivable by the intermediate gear 27 and is axially supported against a stationary component, and a setting ring, which is axially displaceable relative to the support ring 32 and is axially supported on the first clutch part 5, wherein the setting ring forms the clutch actuating member 7. The setting ring 7 is axially supported via an axial bearing 33 on a collar of the first clutch part 5, so that an axial movement of the setting ring causes an axial movement of the clutch part 5. In other respects, the design and operation of the ramp assembly and clutch of the present embodiment correspond to that shown in FIG. 1, so that reference is made to the above description.

The force transmission mechanism 28 for the parking lock 4 comprises a ramp assembly 42, which is arranged on a face side of the ramp gearwheel 27 and interacts with a transmission element 46, which in turn is supported on the parking lock actuating member 19. The ramp arrangement 42 has a setting contour 41, which is configured such that by rotating the ramp gearwheel 27 in the first direction of rotation r1 the transmission element 46, which is supported on the setting contour 41, is loaded axially away from the gearwheel 27. Accordingly, the actuating member 19 is shifted away from the functional face 23 of the locking pawl 18 against the pretensioning force of the spring 31, so that the locking pawl 18 is released and pivoted radially outwards with respect to the ratchet wheel 17 by the spring force of the spring element 22.

By rotating the ramp gearwheel 27 in the opposite second direction of rotation, the transmission element 46 again runs into regions of lesser depth of the ramp setting contour 41. The actuating member 19 is released accordingly and is loaded by the spring 31 against the functional face 23 of the locking pawl 18. If the tooth 20 is located in the region of a gap in the ratchet wheel 17, the actuating member 19 acts on the locking pawl 18 in the closing direction and forces it radially inwards. The tooth 20 positively engages into one of the recesses of the ratchet wheel 18 so that the latter is secured against rotation.

Apart from this, the design and function substantially correspond to the embodiment described in FIGS. 1 and 2, in particular with regard to the adjustable operating modes, the description of which is referred to in this respect.

Figure 4:
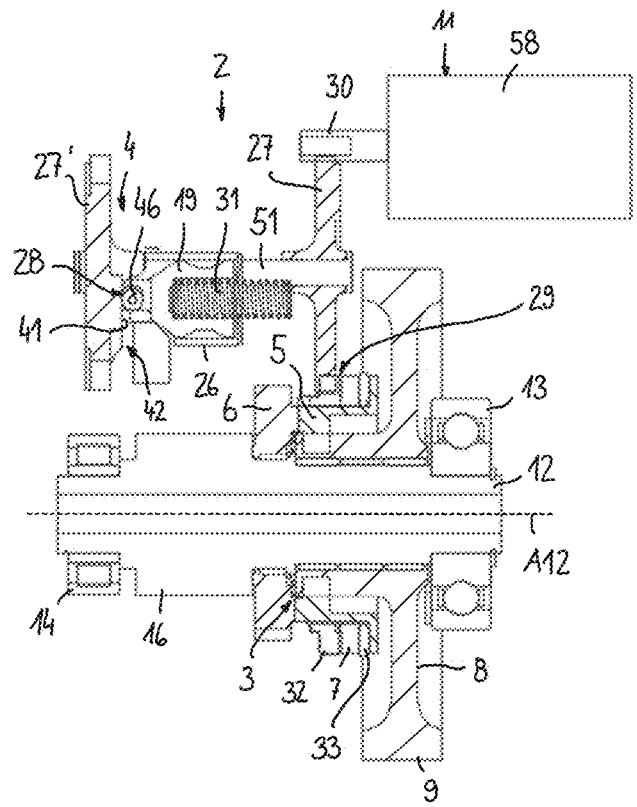
FIG. 4 shows a further example actuator arrangement.

FIG. 4 shows a clutch arrangement 2 in a further embodiment. This largely corresponds to the embodiment as shown in FIGS. 3A to 3C, the description of which is referred to in this respect. The same or corresponding details are marked with the same reference signs as in FIG. 3 or FIG. 1.

A difference lies in the arrangement and configuration of the actuator setting member 27 and the first force transmission mechanism 28. The setting member 27 in the present embodiment is divided into two parts and comprises a gearwheel, which is rotatably drivable by the motor shaft 30 and transmits torque to the rotatably drivable support ring 32 for adjusting the clutch actuating member 7, and a ramp wheel 27', which is connected to the gearwheel 27 in a rotationally fixed manner via an intermediate shaft 51 and is designed for actuating the parking lock actuating member 19. The second transmission mechanism 29 is moreover configured with respect to design and operation mode as in the embodiment shown in FIG. 3, which it is thus referred to with respect to further details.

Figure 5:
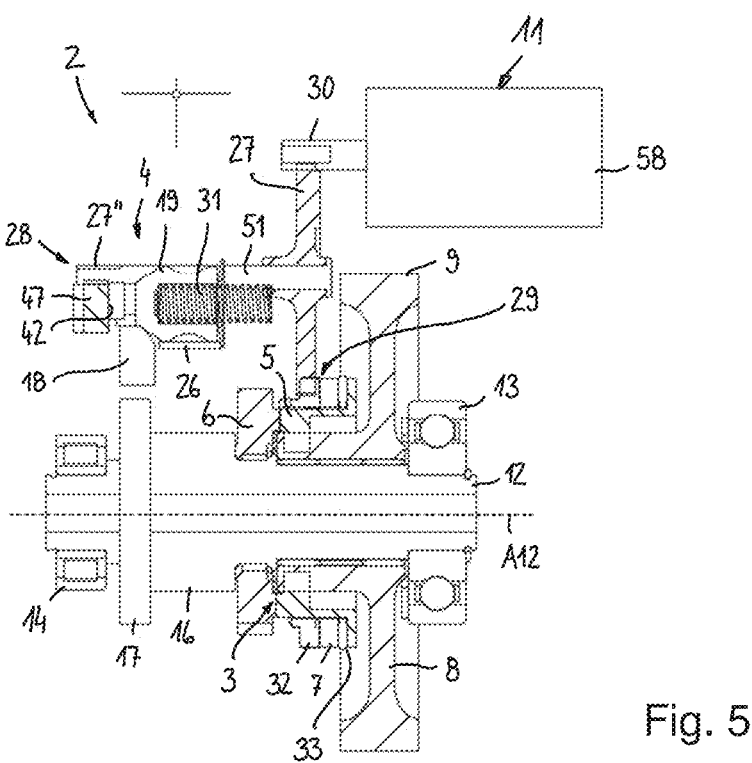
FIG. 5 shows a further example actuator arrangement.

FIG. 5 shows a clutch arrangement 2 in a further embodiment. This widely corresponds to the embodiment as shown in FIGS. 3A to 3C and 4, whose description is referred to in this respect. The same or corresponding details are marked with the same reference signs as in FIGS. 1, 3 and 4.

A difference is in the arrangement and design of the actuator setting member 27 and the first force transmission mechanism 28. The setting member 27 comprises a gearwheel which is rotatably drivable by the motor shaft 30 and transmits torque to the rotatably drivable support ring 32 for adjusting the clutch actuating member 7, and a toothing 27" which transmits torque for operating the parking lock 4. For this purpose, the first force transmission mechanism 28 comprises, in addition to the toothing 27', a toothed rack 47 which is in engagement with the toothing 27" and is linearly shifted upon rotary movement of the shaft 51. The toothed rack 47 has a ramp-shaped side face 42, on which the parking lock actuating member 19 is axially supported with an end face.

By rotating the intermediate gear 27, respectively the actuating shaft 51 rotationally fixedly connected thereto in the first direction of rotation, the toothed rack 47 is moved linearly in a first direction in which the ramp-shaped side face 42 moves into regions of greater depth. The actuating member 19, which is supported on the toothed rack 47 via a transmission element 46, is released accordingly and moved by the spring 31 towards the functional face 23 of the locking pawl 18. The locking pawl 18 is loaded radially inwards with respect to the axis of rotation A12 of the ratchet wheel 17 and engages with a ratchet tooth 20 into a recess of the ratchet wheel 17. The parking lock 4 is thus closed.

By rotating the intermediate gear 27, respectively the actuating shaft 51 rotationally fixedly connected thereto, in the opposite second direction of rotation, the toothed rack 47 is moved linearly in the opposite second direction in which the ramp-shaped side face 42 moves into regions of lesser depth. The actuating member 19 is moved away from the toothed rack 47, respectively from the locking pawl 17 accordingly, so that the locking pawl 17 is released and pivoted radially outwards by the spring 22. The parking lock 4 is thus opened again. The free-running mode is reached when the parking lock 4 and the clutch 3 are both open. Further rotation of the intermediate gear 27 in the second direction of rotation r2 then closes clutch 3, wherein the parking lock 4 remains open.

Besides this, the present embodiment corresponds to the above-mentioned embodiments in terms of structure and mode of operation, and the description of said embodiments is referred to for further details.

Figure 6A:
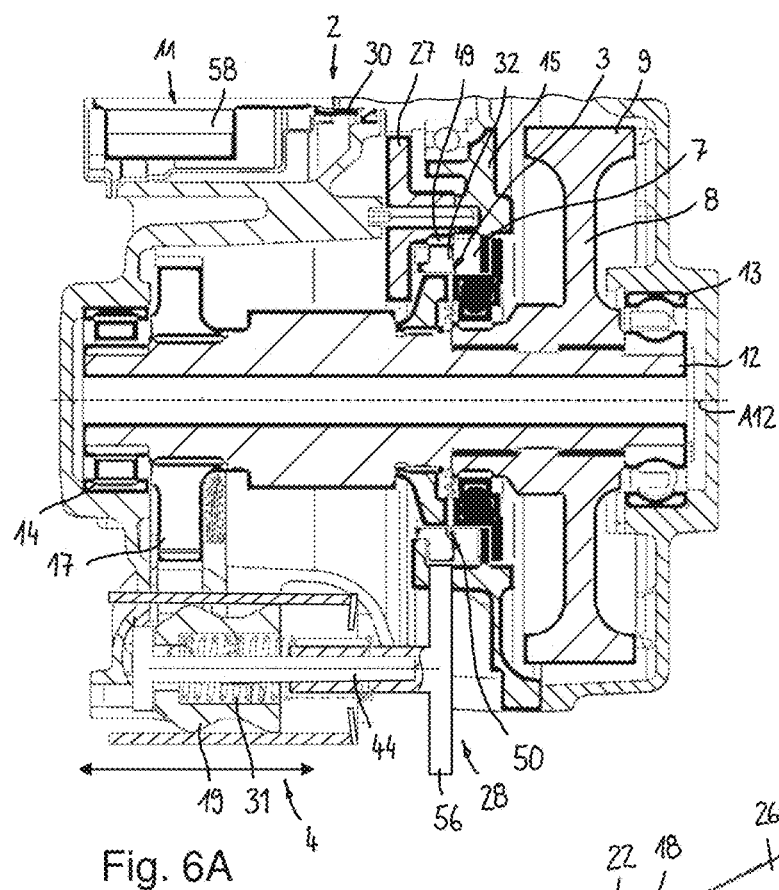
FIG. 6A shows a further example actuator arrangement in sectional view.
Figure 6B:
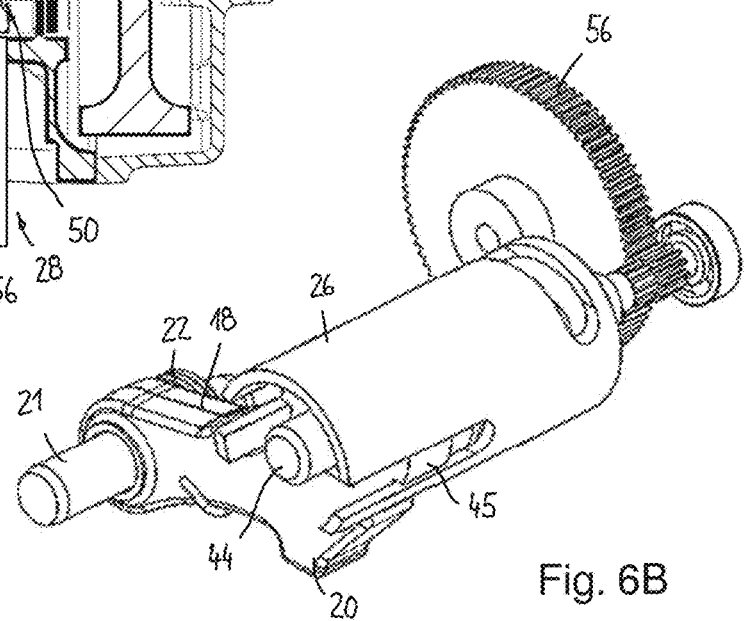
FIG. 6B shows a first force transmission mechanism and parts of the parking lock as a detail further example actuator arrangement of FIG. 6A in a three-dimensional representation.
Figure 6C:
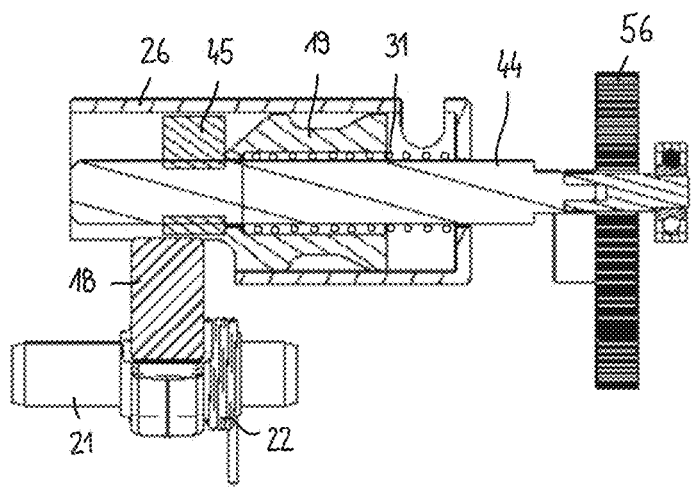
FIG. 6C shows parts of the first force transmission mechanism and the parking lock as a detail in a sectional view of the actuator arrangement of FIG. 6A.

FIGS. 6A, 6B and 6C, which are described together below, show a clutch arrangement 2 in a further embodiment. This widely corresponds to the embodiment according to FIGS. 1 and 2, the description of which is referred to in this respect. The same or corresponding details are provided with the same reference signs as in FIGS. 1 and 2.

The clutch 3 and the parking lock 4 are configured with regard to structure and mode of operation as the embodiment shown in FIG. 1. A difference is that the direction of actuation of the parking lock actuating member 19 in this embodiment is parallel to the drive shaft 12, respectively to its axis of rotation A12.

The clutch 3 and the parking lock 4 are operated by the controllable actuator 11, which can rotate the setting member 27 either in the first direction of rotation r1 or the opposite second direction of rotation r2. The setting member 27 is, as in the above embodiments, designed as a gearwheel which is operatively connected to the clutch actuating member 7 and the parking lock actuating member 19. The operative connection is such that—in each case starting from a neutral position (free-running mode)—in a first direction of rotation the parking lock 4 is closed (parking mode) and in a second direction of rotation the clutch 3 is closed (drive mode).

A special feature of the present embodiment is that the power paths for driving the clutch actuating member 7 on the one hand and the parking lock actuating member 19 on the other hand do not already fork at the intermediate gear 27, but only at the rotationally drivable support ring 32.

The force transmission mechanism 29 for clutch 3 has, as with the embodiment according to FIG. 1, a ramp arrangement 50 configured to convert a rotational movement of the intermediate gear 27 into a translational movement of the clutch actuating member 7. The ramp arrangement 50 comprises the support ring 32 and the setting ring, which forms the clutch actuating member 7. The support ring 32 is rotatably drivable by the intermediate gear 27 and is axially supported against a stationary component. The setting ring is arranged to be rotationally fixed and axially movable and is axially supported against the first clutch part 5.

In the present embodiment, the rotationally drivable support ring 32 has outer teeth 49 which engage with a drive gear 56 to rotatably drive same. The drive gear 56 drives a parking lock shaft 44, and/or is connected thereto in a rotationally fixed manner, which is configured in the form of a spindle shaft. The parking lock actuating member 19 is arranged on the spindle shaft 44 such that the parking lock actuating member 19 is axially movable by rotating the parking lock shaft 44. For this, the parking lock shaft 44 interacts with a spindle nut 45 screwed thereon. The spindle nut 45 serves as an axial stop and/or support face for the actuating member 19. The actuating member 19 is loaded by the spring 31 against the spindle nut 45, respectively in the direction of the functional face 23 of the locking pawl 18.

By driving the intermediate gear 27 in a first direction of rotation r1, the support ring 32 is rotatably driven about the axis of rotation A12 and the spindle shaft 44 driven by same is rotatably driven about the shaft axis A44 in a first direction of rotation. This moves the spindle nut 45, which is screwed onto the spindle shaft 44 that is nonrotatably held in guide slots of the sleeve 26, towards the locking pawl 18. The actuating member 19, which is axially supported on the spindle nut 45, is moved by the spring 31 in the direction of the functional face 23 of the locking pawl 18. The locking pawl 18 is loaded radially inwards with respect to the axis of rotation A12 of the ratchet wheel 17 and engages with the ratchet tooth 20 in a recess of the ratchet wheel 17. The parking lock 4 is thus closed.

By rotating the intermediate gear 27 in the opposite second direction of rotation r2, the spindle shaft 44 is driven in the opposite direction of rotation via the support ring 32, so that the spindle nut 45 screwed on the shaft is moved away from the locking pawl 18. The setting member 19 is moved away from the functional face 23 of the locking pawl 18. The locking pawl 18 is released and, loaded by the spring 22, can pivot radially outwards. The parking lock 4 is thus opened again.

The free-running mode is reached when the parking lock 4 and the clutch 3 are both open. By further rotating the intermediate gear 27 in the second direction of rotation r2, the clutch 3 is then closed while parking lock 4 remains open.

Beyond this, the present embodiment corresponds to the above-mentioned embodiments in terms of structure and mode of operation, and the description of said embodiments is referred to for further details.

Figure 7A:
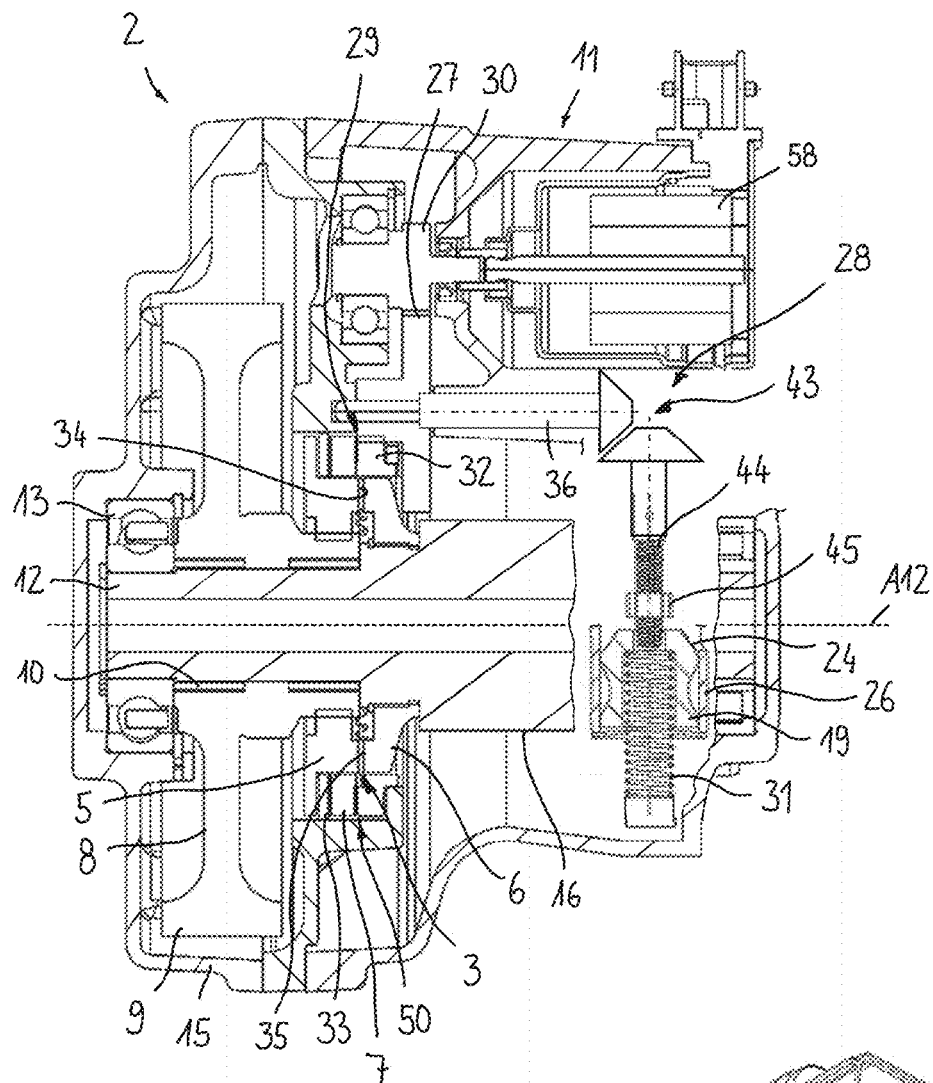
FIG. 7A shows a further example actuator arrangement in a sectional view.
Figure 7B:
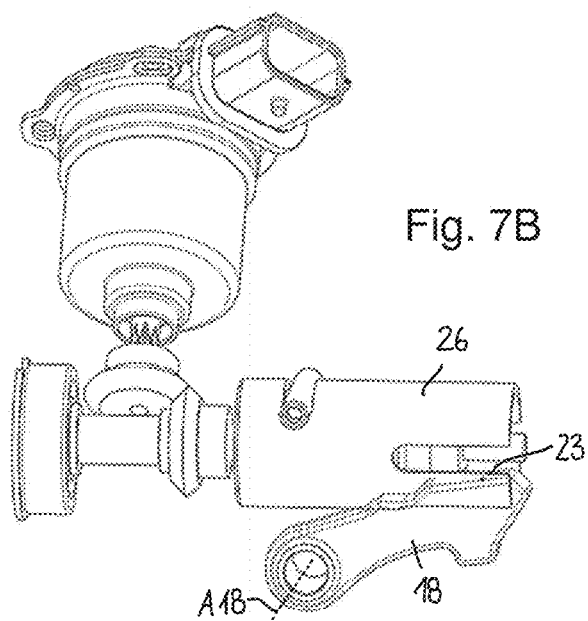
FIG. 7B shows parts of the first force transmission mechanism and the parking lock as a detail in a three-dimensional representation of the actuator arrangement of FIG. 7A.

FIGS. 7A and 7B, which are described together below, show a clutch arrangement 2 in a further embodiment. This widely corresponds to the embodiment according to FIGS. 1 and 2, the description of which is insofar referred to. The same and/or corresponding details are marked with the same reference signs as in FIG. 1.

A difference is the configuration of the first force transmission mechanism 28, which in the present case comprises an angle drive 43 with a rotationally drivable actuating shaft 36 and a parking lock shaft 44 drivingly connected thereto.

The parking lock shaft 44 is designed in the form of a spindle shaft on which the parking lock actuating member 19 is arranged such that the parking lock actuating member 19 is axially movable by rotating the parking lock shaft 36. For this, the parking lock shaft 44 is designed to cooperate with a spindle nut 45 screwed thereon. The spindle nut 45 serves as an axial stop and/or support face for the actuating member 19. The actuating member 19 is loaded by the spring 31 against the spindle nut 45, respectively in the direction of the functional face 23 of the locking pawl 17.

By rotating the intermediate gear 27, respectively the actuating shaft 36 rotationally fixedly connected thereto, in the first direction of rotation, the spindle shaft 44 is driven accordingly via the angle drive 43, so that the spindle nut 45 screwed thereon is moved towards the angle drive 43. The actuating member 19 is released accordingly and moved by the spring 31 in the direction of the functional face 23 of the locking pawl 18. The locking pawl 18 is loaded radially inwards with respect to the rotation axis A12 of the ratchet wheel 17 and engages with the ratchet tooth 20 into a recess of the ratchet wheel 18. The parking lock 4 is thus closed.

By rotating the intermediate gear 27, respectively the actuating shaft 36 rotationally fixedly connected thereto, in the opposite second direction of rotation r2, the spindle shaft 44 is driven in the opposite direction of rotation via the angle drive 43, so that the spindle nut 45 screwed thereon moves away from the angle drive 43. The actuating member 19 is correspondingly moved away from the functional face 23 of the locking pawl 18. The locking pawl 18 is released and, loaded by the spring 22, can pivot radially outwards. The parking lock 4 is thus opened again.

Apart from that, the structure and mode of operation substantially correspond to the embodiment described in FIGS. 1 and 2, in particular with regard to the adjustable operating modes, the description of which is referred to in this respect.

Figure 8A:
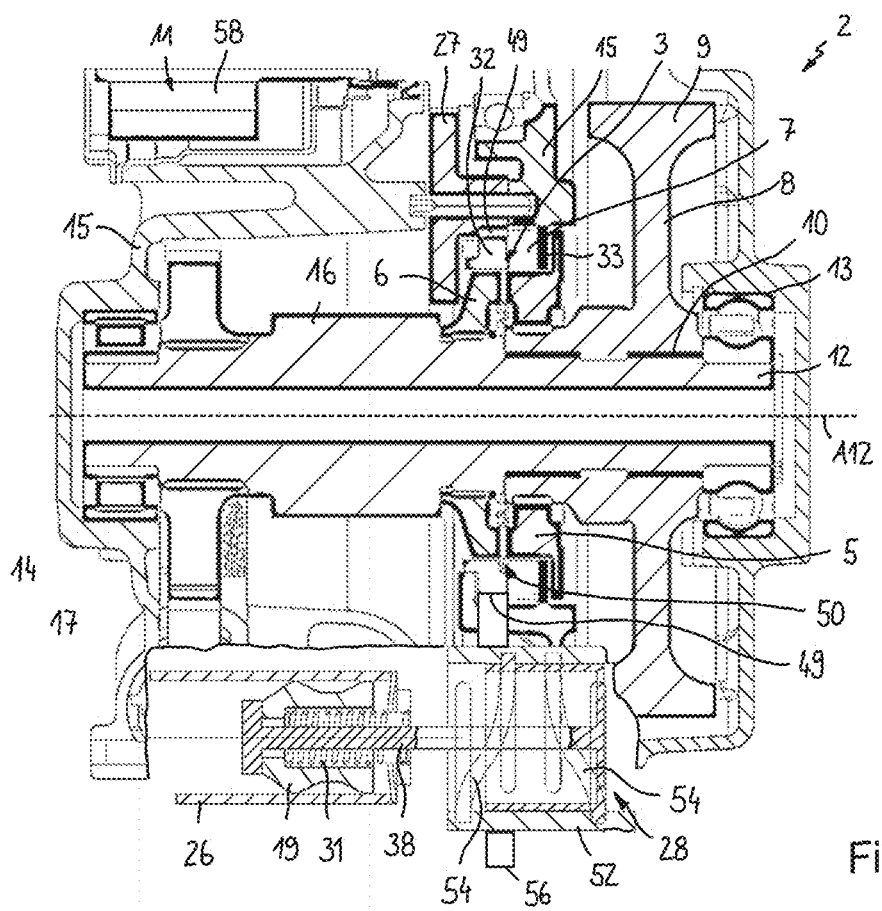
FIG. 8A shows a further example actuator arrangement in an open position of the parking lock.
Figure 8B:
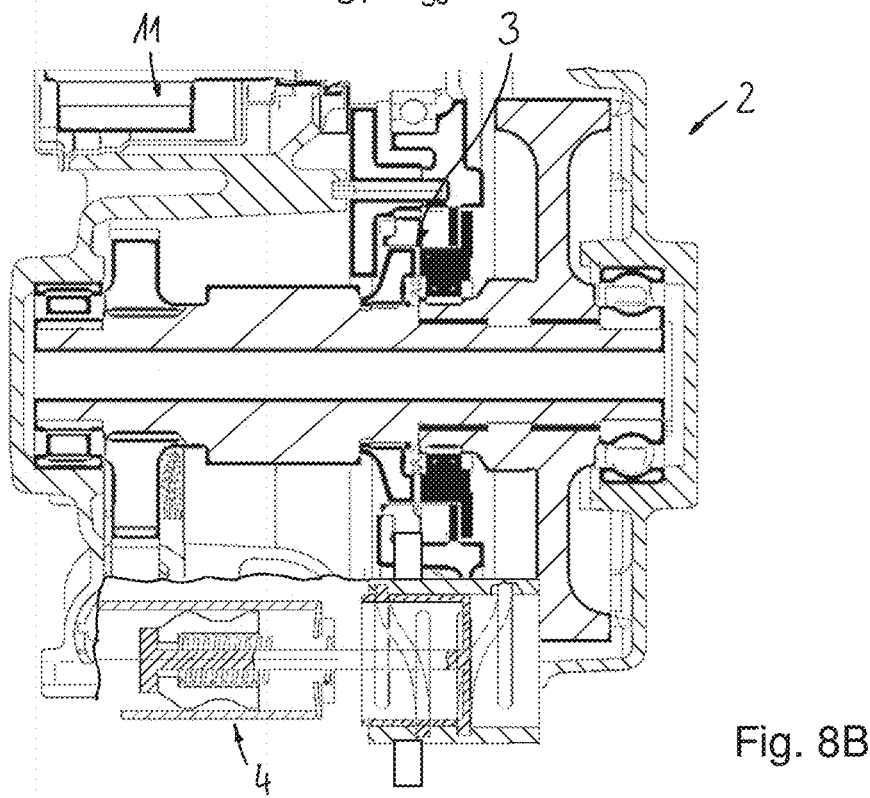
FIG. 8B shows the example actuator arrangement of FIG. 8A in a closed position of the parking lock.

FIGS. 8A and 8B, which are described together below, show a clutch arrangement 2 in a further embodiment. This widely corresponds to the embodiment according to FIGS. 6A to 6C, to the description of which it is referred to in this respect. The same or corresponding details are marked with the same reference signs as in FIGS. 1 to 6.

The only difference to the embodiment according to FIG. 6 is the design of the transmission mechanism 28 for the parking lock 4. In the present embodiment according to FIG. 8, the transmission mechanism 28 comprises a shift drum 52, which is rotatable by the rotationally drivable support ring 32. For this, the shift drum 52 has an outer toothing 53 which is in engagement with the outer toothing 49 of the support ring 32. The shift drum 52 has two diametrically opposed setting contours 54, in which a pin 55 coupled to the sleeve 26 engages with its ends. The setting contours 54 of the shift drum 52 are configured such that a rotary movement of the shift drum 52 is converted into a translatory movement of the pin 55, respectively of the clutch actuator 19 connected thereto via a coupling rod 38.

By driving the intermediate gear 27 in a first direction of rotation r1, the support ring 32 is driven around the axis of rotation A12, and the shift drum 52 is driven around the drum axis A52 in a first direction of rotation. Thereby, the pin 55 guided in the setting contours 54 and the coupling rod 38 connected thereto are moved towards the locking pawl 18. The actuating member 19, which is held on the coupling rod 38 with spring preload, is moved in the direction of the functional face 23 of the locking pawl 18 and acts upon same radially inwardly with respect to the rotation axis A12 of the ratchet wheel 17. The ratchet tooth 20 of the locking pawl 18 engages into a recess of the ratchet wheel 17. The parking lock 4 is thus closed; this switching state is shown in FIG. 8B.

By rotating the intermediate gear 27 in the opposite second direction of rotation r2, the shift drum 52 is driven in the reverse direction of rotation via the support ring 32. Thereby, the pin 55 guided in the setting contours 54 and the coupling rod 38 connected thereto are moved axially away from the locking pawl 18. The actuating member 19 is correspondingly moved away from the functional face 23 of the locking pawl 18. The locking pawl 18 is released and, loaded by the spring 22, can pivot radially outwardly. The parking lock 4 is thus opened again; this switching state is shown in FIG. 8A.

The free-running mode is reached when the parking lock 4 and the clutch 3 are both open. By further rotating the intermediate gear 27 in the second direction of rotation r2, the clutch 3 is then closed while the parking lock 4 remains open. In other respects, the present embodiment corresponds to the above-mentioned embodiments in terms of structure and mode of operation, and reference is made to their description for further details.

FIGS. 9A to 9C, which are described together below, show a force transmission mechanism 28 for the actuator arrangement 2 from FIG. 8 in a slightly modified embodiment. The same or corresponding details are marked with the same reference signs as in FIG. 8. In order to illustrate the rotary drive of the shift drum 52, an electric motor 58 is shown here, which is only representative of the meshing engagement of the shift drum 52 with the outer teeth 49 of the rotatably driven support wheel 32. The only difference to the embodiment according to FIG. 8 is the design of the shift drum 52, which in this case has only one pair of setting contours 54, into which the pin 55 connected to the coupling rod 38 engages with its ends. The setting contours 54 of the shift drum 52 are designed such that a rotary movement of the drum 52 is converted into a translatory movement of the pin 55 and, respectively, the clutch actuating member 19 connected thereto via a coupling rod 38. In other respects, the present embodiment corresponds to the above embodiment as shown in FIG. 8 with regard to its structure and mode of operation, and the description of said embodiment is referred to for further details.

In the embodiments shown in FIGS. 8 and 9, the shifting drums 52 each have internal setting contours 54, which are engaged by a pin 55 located inside the shifting drum. It is understood that further modified embodiments are possible, in particular as a kinematic reversal, i.e. with a shift drum with an external setting contour into which a stationary pin arranged outside the shift drum engages. In other respects, the kinematics are the same as for the embodiments according to FIGS. 8 and 9, i.e. a rotary movement of the shift drum leads to an axial movement of the coupling rod 39 and the associated actuating member 19.

Figure 10A:
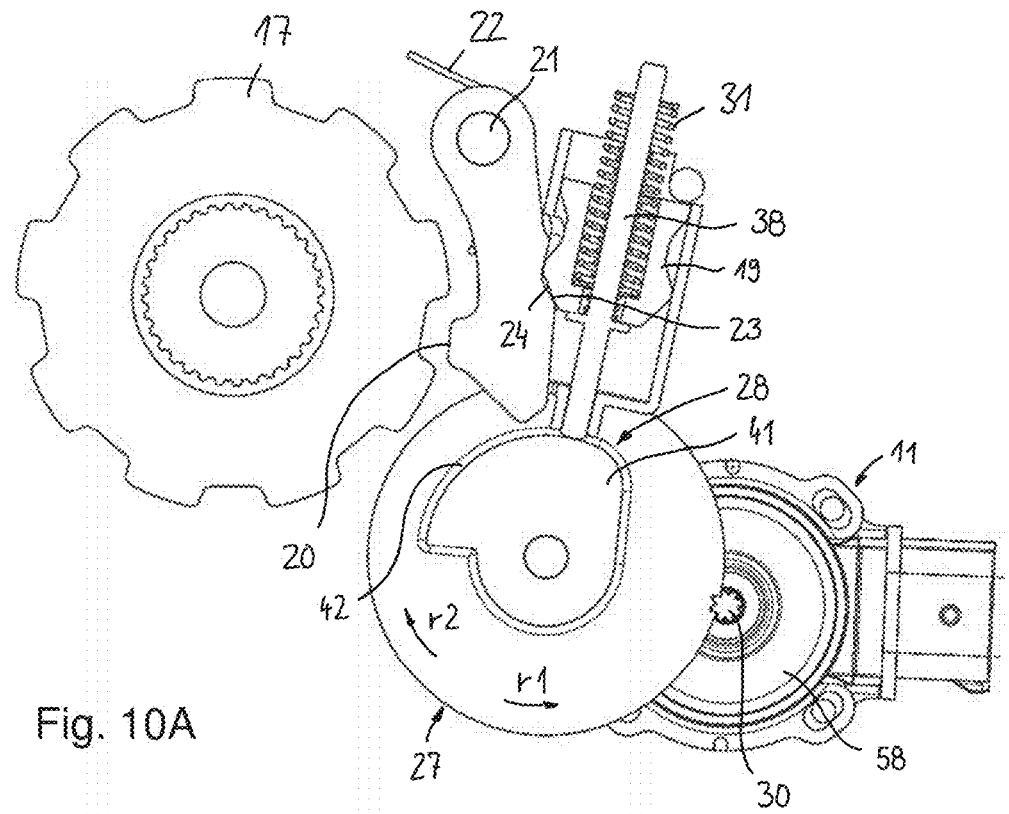
FIG. 10A shows a further example actuator arrangement in lateral view, partly cut.
Figure 10B:
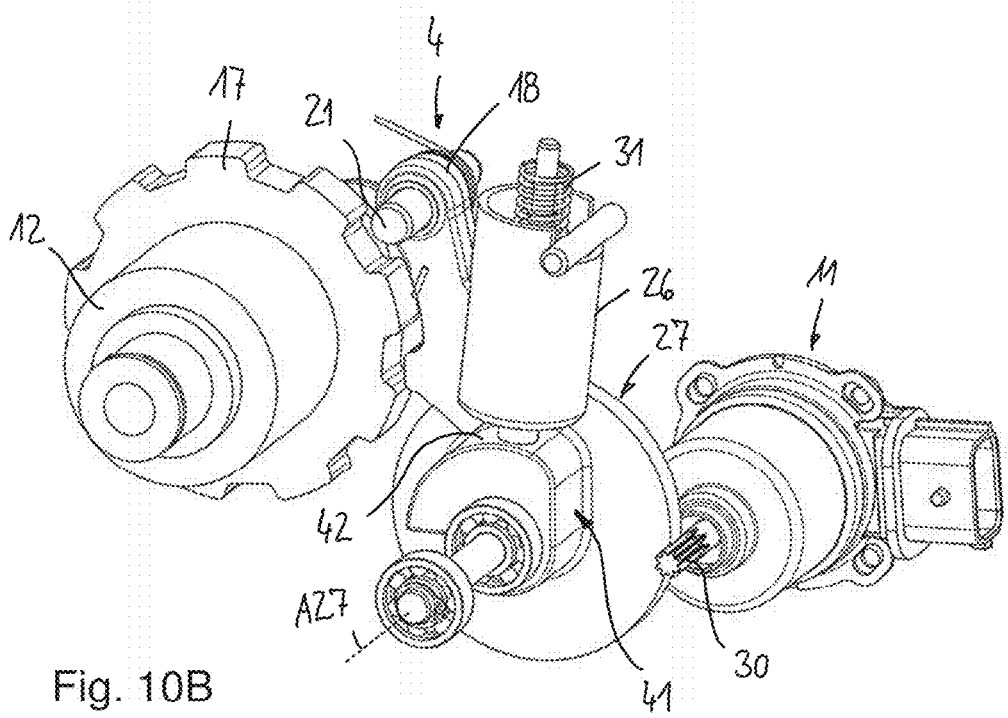
FIG. 10B shows the example actuator arrangement of FIG. 10A in a three-dimensional view.

FIGS. 10A and 10B, which are described together below, show an actuator arrangement 2 in a further embodiment. This widely corresponds to the embodiment shown in FIG. 3, the description of which is referred to in this respect. The same and/or corresponding details are provided with the same reference signs as in the figures described above.

The actuator 11, the setting wheel 27 and the parking lock 4 are shown. The setting wheel 27 is to be engaged with the rotationally drivable support wheel 32 to control the clutch 3. The clutch 3, which is not shown here, can be configured as shown in FIG. 3.

The parking lock 4 comprises the ratchet wheel 17, which is connected to the drive shaft 12 in a rotationally fixed manner, the locking element 18, which interacts with the ratchet wheel 17 and is movably accommodated in the stationary housing 15, and the parking lock actuating member 19 for actuating the locking element 18. The locking element 18 can be moved into a locking position in which it locks the ratchet wheel 17 so that the drive shaft 12 is held rotationally fixed, and into a release position in which the locking element 18 releases the ratchet wheel 17 so that the ratchet wheel 17 and the drive shaft 12 connected thereto can rotate freely. The locking element 18 is formed as a locking pawl which by the bearing pin 21 is mounted in a stationary component so as to be pivotable about the pivot axis A21. The spring element 22 is provided to move the locking pawl 18 from the locked position to the release position.

On its rear side facing away from the ratchet wheel 17, the locking pawl 18 has a functional face 23 on an outside which interacts with the pressure face 24 of the actuating member 19. In the present embodiment, the direction of movement of the actuating member 19, which loaded by the spring 31 towards the setting wheel 27, crosses the axis of rotation A12 of the drive shaft and the pivot axis A18 of the locking pawl 18 vertically with a distance. The functional face 23 of the locking pawl 18 is inclined so that a translatory movement of the actuating member 19 is converted into a pivoting movement of the locking pawl 18. The actuating member 19 has a conical pressure face 24, which is why it can also be referred to as cone. To guide and support the actuating member 19, the guide sleeve 26 is provided in which the actuating member 19 is guided so as to be axially movable.

The clutch 3 and the parking lock 4 are operated by the controllable actuator 11, which in the present embodiment is designed as an electro-motive actuator. The motor shaft 30 of the electric motor is in engagement with the setting member 27 and can rotate same in a first direction of rotation or in an opposite second direction of rotation. The setting member is operatively connected to the clutch actuating member 7 (not shown) and to the parking lock actuating member 19. The operative connection is such that upon rotary driving in the first direction of rotation r1, the parking lock 4 is closed (parking mode) and upon rotary driving in the second direction of rotation r2, the clutch 3 is closed (drive mode). In an intermediate position of setting member 27, the clutch 3 and the parking lock 4 are open (free-running mode). The setting member 27 is operatively connected to the parking lock actuating member 19 via the first force transmission mechanism 28.

In the present embodiment, the setting member 27 is designed in the form of a combined ramp gearwheel, which is mounted in a stationary housing so as to be rotatable about an axis of rotation A27. The ramp gearwheel 27 has external teeth, into which the drive pinion 30 of the electric motor 58 engage for torque transmission, and transmits the rotary motion to the first and/or second force transmission mechanism 28, 29.

In the present embodiment, the first force transmission mechanism 28 has a ramp arrangement 42 with a setting contour running spirally around the axis of rotation A27. The setting contour interacts with a coupling rod 38, an end of which being supported on the setting contour. On the coupling rod 38, the actuating member 19 is held in an axially movable manner and is loaded against a stop by the spring 31. The setting contour of the ramp arrangement 42 is formed such that by rotating the ramp gearwheel 27 in the first direction of rotation r1, the coupling rod 38, which is supported on the setting contour, and the actuating member 19 supported thereagainst are loaded by the spring 31 towards the axis of rotation A27. Accordingly, the actuating member 19 with its conical face 24 is moved to the functional face 23 of the locking pawl 18 so that the latter is pivoted radially inwards and the locking tooth 20 engages into a tooth gap of the ratchet wheel 17.

By rotating the ramp gearwheel 27 in the opposite second direction of rotation r2, the coupling rod 38 and the associated actuating member 19 are moved radially outwards from the ramp setting contour. The actuating member 19 releases the locking pawl 18 accordingly, which is pivoted outwardly by the spring 22. This release position is shown in FIGS. 10A and 10B. In other respects, the design and mode of operation substantially correspond to the above examples, especially with regard to the settable operating modes, to the description of which it is hereby referred to.

Figure 11:
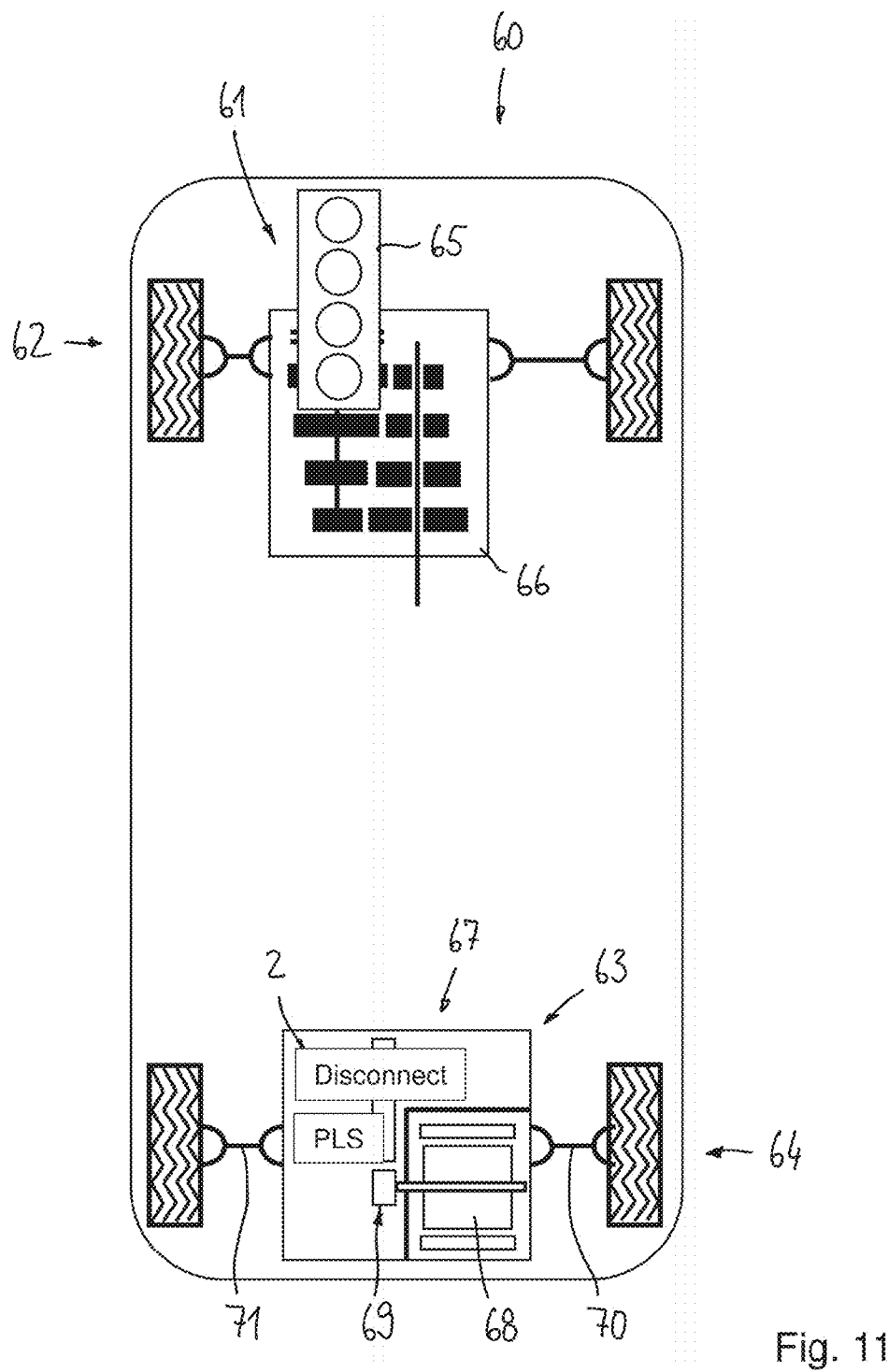
FIG. 11 shows a driveline arrangement for a motor vehicle with two drivelines.

FIG. 11 shows a mechanical driveline arrangement 60 of a motor vehicle. The driveline arrangement 60 comprises a first driveline 61 with a first drive axle 62 and a second driveline 63 with a second drive axle 64. The two drivelines 61, 63 are mechanically separated from each other. The first driveline 61 can be driven by a first drive unit 65, which is in particular configures as an internal combustion engine, wherein however other drive sources such as an electric machine are also possible. The first drive unit 65 may be followed by a multi-step transmission 66, which converts the engine torque into a drive torque, respectively the engine speed into a drive speed. The second driveline 63 comprises an electric drive 67, which can be driven by a second drive unit 68 in the form of an electric machine.

The electric drive 67 comprises a reduction gearing 69 downstream of the electric motor 68 and a power split unit downstream of the reduction gearing, which distributes the introduced torque to the two side shafts 70, 71. The electric drive 67 further comprises an actuator arrangement 2 with the clutch 3 arranged in the power path between the electric motor 68 and the power splitting unit, and the parking lock 4 that can act on a drive component in the power path to lock or release it. The actuator arrangement 2 can be configured according to any one of the embodiments described above according to FIGS. 1 to 10.

LIST OF REFERENCE SIGNS 2 actuator arrangement
3 clutch
4 parking lock
clutch input part
6 clutch output part
7 clutch actuating member
8 drive part
9 drive gear
bearing means
11 actuator
12 drive shaft
13 bearing means
14 bearing means
housing
16 output gear
17 ratchet wheel
18 locking element
19 parking lock actuating member
locking tooth
21 bearing bolt
22 spring element
23 functional face
24 pressure face
actuating member
26 guide sleeve
27 actuator setting member
28 force transmission mechanism
29 force transmission mechanism
drive pinion
31 spring
32 support ring
33 axial bearings
34 engagement means
35 engagement means
36 actuating shaft
37 spindle sleeve
38 coupling rod
39 drive pinion
40 end
41 contour element
42 ramp arrangement
43 angular drive
44 parking lock shaft/spindle shaft
45 spindle nut
46 transmission element
47 toothed rack
48 drive gear
49 external toothing
50 ramp arrangement
51 shaft
52 switch drum
53 external toothing
54 setting contours
55 pin
56 drive gear
57
58 electric motor
59
60 driveline arrangement
61 first driveline
62 first drive axle
63 second driveline
64 second drive axle
65 first drive unit
66 multi-speed transmission
67 electric drive
68 second drive unit
69 reduction gearing
70 side shaft
71 side shaft
A axis
C position (clutch)
P position (parking lock)
r direction
S setting position

The invention claimed is:

1. An actuator arrangement for a driveline of a motor vehicle, comprising:
a clutch having a rotatably drivable clutch input part, a clutch output part and a clutch actuating member configured to drivingly connect or disconnect the clutch input part and the clutch output part to or from each other;
a parking lock with a ratchet wheel which is connected in a rotationally fixed manner to a drive shaft drivingly connected to the clutch output part, a locking element which cooperates with the ratchet wheel and is movable into a locking position in which the locking element locks the ratchet wheel, and into a release position in which the locking element releases the ratchet wheel, and a parking lock actuating member for actuating the locking element; and a controllable actuator with a movable actuator setting member which is transferable into at least three setting positions and is operatively connected to the clutch actuating member and to the parking lock actuating member such, that in a first setting position the parking lock is closed, in a second setting position the parking lock is open and the clutch is closed, and in a third setting position the clutch and the parking lock are open, wherein the actuator setting member is configured in the form of an intermediate gear and comprises a toothing which engages a rotatably drivable ring for actuating the clutch.

2. The actuator arrangement according to claim 1,
wherein the clutch is open or closed in the first setting position of the actuator setting member.

3. The actuator arrangement according to claim 1,
wherein the actuator setting member is connected to the parking lock actuating member via a first force transmission mechanism and is connected to the clutch actuating member via a second force transmission mechanism.

4. The actuator arrangement according to claim 3,
wherein the parking lock actuating member is movable by the first force transmission mechanism along a first travel path for actuating the parking lock, and the clutch actuating member is movable by the second force transmission mechanism along a second travel path for actuating the clutch, wherein the first travel path and the second travel path are matched to each other and configured such that when one of the clutch and parking lock is actuated, the respective other one of the clutch and the parking lock is held in a stable position.

5. The actuator arrangement according to claim 3,
wherein the first force transmission mechanism comprises a spindle drive with a rotationally drivable spindle shaft and a spindle sleeve connected thereto, and a coupling rod, wherein the spindle sleeve has a slot with a gradient component, in which slot the coupling rod is guided with a first end, and wherein a second end of the coupling rod is connected to the parking lock actuating member, so that an axial movement of the spindle sleeve at least indirectly causes a shifting movement of the parking lock actuating member.

6. The actuator arrangement according to claim 3,
wherein the first force transmission mechanism comprises a contour element with a setting contour which is configured to convert a rotational movement of the actuator setting member into a translatory movement of the parking lock actuating member.

7. The actuator arrangement according to claim 6,
wherein the contour element of the first force transmission mechanism is connected to the actuator setting member and is integrally formed therewith.

8. The actuator arrangement according to claim 6,
wherein the contour element of the first force transmission mechanism is drivingly connected to the actuator setting member via an intermediate shaft.

9. The actuator arrangement according to claim 6,
wherein the first force transmission mechanism has a coupling rod, against which the parking lock actuating member is at least indirectly supported, wherein the coupling rod is loaded by a spring in the direction of the setting contour and is supported thereagainst, wherein the setting contour is configured such that by rotating the actuator setting member the coupling rod is moved radially with respect to the axis of rotation of the actuator setting member.

10. The actuator arrangement according to claim 3,
wherein the first force transmission mechanism comprises an angle drive with a drivingly rotatable actuating shaft and a parking lock shaft drivingly connected thereto and on which the parking lock actuating member is arranged such that the parking lock actuating member is axially movable by rotating the parking lock shaft.

11. The actuator arrangement according to claim 3,
wherein the first force transmission mechanism comprises a spindle drive with a rotationally drivable spindle shaft and a spindle nut connected thereto, against which the parking lock actuating member is at least indirectly supported, wherein the spindle shaft is connected in a rotational fixed manner to a drive gear which engages the rotatably drivable ring.

12. The actuator arrangement according to claim 3,
wherein the first force transmission mechanism comprises a setting sleeve that is rotatably drivable by the rotatably drivable ring of the second force transmission mechanism, and a coupling element connected to the parking lock actuating member, wherein one of the two parts, setting sleeve and coupling element, has a setting contour which interacts with a counter contour of the other one of the two parts such that a rotary movement of the setting sleeve causes a shifting movement of the parking lock actuating member.

13. The actuator arrangement according to claim 3,
wherein the second force transmission mechanism comprises a ramp arrangement which is configured to convert a rotary movement of the actuator setting member into a translatory movement of the clutch actuating member; and
wherein the ramp arrangement has a support ring, which is axially supported against a stationary component, and a setting ring, which is axially displaceable with respect to the support ring, wherein the setting ring forms the clutch actuating member.

14. The actuator arrangement according to claim 1,
wherein the controllable actuator comprises a rotary drive which can rotatably drive the actuator setting member in a first direction of rotation and in an opposite second direction of rotation.

15. The actuator arrangement according to claim 1,
wherein an elastically pretensioned fixing element is provided in order to fix the actuator setting member in at least one of the at least three setting positions; and
wherein a position sensor is provided which is configured to detect a measured value representing the position of the actuator setting member.

16. The actuator arrangement according to claim 1,
wherein a return spring is provided between the clutch input part and the clutch output part, which spring loads the clutch in a closing direction.

17. The actuator arrangement according to claim 1, in an electric drive assembly for driving a motor vehicle that comprises:
an electric machine with a motor shaft;
a reduction gearing configured to transmit a torque introduced by the motor shaft to a slow speed;
a power distribution unit having an input part and two output parts, which is configured to transmit a rotary motion introduced into the input part by the reduction gearing to the two output parts;
with the actuator arrangement arranged in a power path of the reduction gearing of the electric drive.

18. An actuator arrangement for a driveline of a motor vehicle, comprising:

a clutch having a rotatably drivable clutch input part, a clutch output part and a clutch actuating member configured to drivingly connect or disconnect the clutch input part and the clutch output part to or from each other;

a parking lock with a ratchet wheel which is connected in a rotationally fixed manner to a drive shaft drivingly connected to the clutch output part, a locking element which cooperates with the ratchet wheel and is movable into a locking position in which the locking element locks the ratchet wheel, and into a release position in which the locking element releases the ratchet wheel, and a parking lock actuating member for actuating the locking element; and a controllable actuator with a movable actuator setting member which is transferable into at least three setting positions and is operatively connected to the clutch actuating member and to the parking lock actuating member such, that in a first setting position the parking lock is closed, in a second setting position the parking lock is open and the clutch is closed, and in a third setting position the clutch and the parking lock are open;

wherein the actuator setting member is connected to the parking lock actuating member via a first force transmission mechanism and is connected to the clutch actuating member via a second force transmission mechanism; and wherein the first force transmission mechanism comprises a setting sleeve that is rotatably drivable by a rotatably drivable member of the second force transmission mechanism, and a coupling element connected to the parking lock actuating member, wherein one of the two parts, setting sleeve and coupling element, has a setting contour which interacts with a counter contour of the other one of the two parts such that a rotary movement of the setting sleeve causes a shifting movement of the parking lock actuating member.

19. An actuator arrangement for a driveline of a motor vehicle, comprising:

a clutch having a rotatably drivable clutch input part, a clutch output part and a clutch actuating member configured to drivingly connect or disconnect the clutch input part and the clutch output part to or from each other;

a parking lock with a ratchet wheel which is connected in a rotationally fixed manner to a drive shaft drivingly connected to the clutch output part, a locking element which cooperates with the ratchet wheel and is movable into a locking position in which the locking element locks the ratchet wheel, and into a release position in which the locking element releases the ratchet wheel, and a parking lock actuating member for actuating the locking element; and a controllable actuator with a movable actuator setting member which is transferable into at least three setting positions and is operatively connected to the clutch actuating member and to the parking lock actuating member such, that in a first setting position the parking lock is closed, in a second setting position the parking lock is open and the clutch is closed, and in a third setting position the clutch and the parking lock are open;

wherein the actuator setting member is connected to the parking lock actuating member via a first force transmission mechanism and is connected to the clutch actuating member via a second force transmission mechanism; and wherein the first force transmission mechanism comprises a contour element with a setting contour which is configured to convert a rotational movement of the actuator setting member into a translatory movement of the parking lock actuating member.

20. The actuator arrangement according to claim 19, wherein the first force transmission mechanism has a coupling rod, against which the parking lock actuating member is at least indirectly supported, wherein the coupling rod is loaded by a spring in the direction of the setting contour and is supported thereagainst, wherein the setting contour is configured such that by rotating the actuator setting member the coupling rod is moved radially with respect to the axis of rotation of the actuator setting member.

* * * * *